(12) United States Patent
Shi

(10) Patent No.: US 12,477,211 B2
(45) Date of Patent: Nov. 18, 2025

(54) CAMERA CONTROL METHOD AND APPARATUS, AND STORAGE MEDIUM

(71) Applicant: Huawei Technologies Co., Ltd., Shenzhen (CN)

(72) Inventor: Haojun Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 18/256,504

(22) PCT Filed: Dec. 1, 2021

(86) PCT No.: PCT/CN2021/134826
§ 371 (c)(1),
(2) Date: Jun. 8, 2023

(87) PCT Pub. No.: WO2022/121751
PCT Pub. Date: Jun. 16, 2022

(65) Prior Publication Data
US 2024/0056673 A1  Feb. 15, 2024

(30) Foreign Application Priority Data
Dec. 9, 2020 (CN) .......................... 202011451138.5

(51) Int. Cl.
*H04N 23/63* (2023.01)
*H04N 23/661* (2023.01)

(52) U.S. Cl.
CPC ......... *H04N 23/631* (2023.01); *H04N 23/633* (2023.01); *H04N 23/661* (2023.01)

(58) Field of Classification Search
CPC .. H04N 23/631; H04N 23/633; H04N 23/661; H04N 23/635; H04N 23/67;
(Continued)

(56) References Cited

U.S. PATENT DOCUMENTS

| 7,113,971 B1 * | 9/2006 | Ohi ...................... H04N 23/661 |
| | | 348/211.3 |
| 7,161,619 B1 * | 1/2007 | Niida ...................... H04N 23/66 |
| | | 382/167 |

(Continued)

FOREIGN PATENT DOCUMENTS

| CN | 102710549 A | 10/2012 |
| CN | 104320586 A | 1/2015 |

(Continued)

OTHER PUBLICATIONS

Apple Watch User Guide, Use the camera and timer on your Apple Watch, Jun. 5, 2018, with an English translation, 4 pages.

*Primary Examiner* — Timothy J Henn
(74) *Attorney, Agent, or Firm* — Conley Rose, P.C.

(57) ABSTRACT

A camera control method includes receiving image data from a second terminal device, where the image data is captured by the second terminal device in a photographing process, determining an operation command and status information, where the operation command is an operation command for the photographing process of the second terminal device, and the status information indicates an execution status of the operation command executed by the second terminal device, displaying a picture based on the image data, and displaying the execution status of the operation command on the picture based on the operation command and the status information.

20 Claims, 12 Drawing Sheets

(58) Field of Classification Search
CPC ... H04N 23/69; H04N 23/57; H04M 1/72439; H04M 1/72469; H04M 1/72412; H04M 2250/52; H04M 1/0264
See application file for complete search history.

(56) References Cited

U.S. PATENT DOCUMENTS

| | | | |
|---|---|---|---|
| 2007/0254640 A1* | 11/2007 | Bliss | H04N 23/66 455/420 |
| 2010/0079607 A1* | 4/2010 | Won | H04N 23/64 348/E5.042 |
| 2011/0273570 A1 | 11/2011 | Sakaki | |
| 2014/0354837 A1* | 12/2014 | Okazaki | H04N 23/66 348/211.2 |
| 2016/0100099 A1 | 4/2016 | Oyman et al. | |
| 2017/0026566 A1 | 1/2017 | Nitto | |
| 2018/0103192 A1* | 4/2018 | Iwasaki | G06F 3/005 |
| 2018/0130167 A1 | 5/2018 | Mao et al. | |
| 2018/0234613 A1* | 8/2018 | Fukunaga | H04N 23/661 |
| 2018/0336780 A1 | 11/2018 | Ran et al. | |
| 2020/0274919 A1 | 8/2020 | Shah et al. | |
| 2021/0092290 A1* | 3/2021 | Takami | H04N 23/69 |
| 2021/0216267 A1 | 7/2021 | Lu | |
| 2021/0297478 A1 | 9/2021 | Wu et al. | |
| 2023/0128746 A1 | 4/2023 | He et al. | |

FOREIGN PATENT DOCUMENTS

| | | |
|---|---|---|
| CN | 104349032 A | 2/2015 |
| CN | 104796610 A | 7/2015 |
| CN | 106412483 A | 2/2017 |
| CN | 107992255 A | 5/2018 |
| CN | 108076379 A | 5/2018 |
| CN | 108270971 A | 7/2018 |
| CN | 110162255 A | 8/2019 |
| CN | 110300260 A | 10/2019 |
| CN | 111988528 A | 11/2020 |
| CN | 110945863 B | 5/2021 |
| CN | 110971823 B | 6/2021 |
| JP | 2007028254 A | 2/2007 |

* cited by examiner

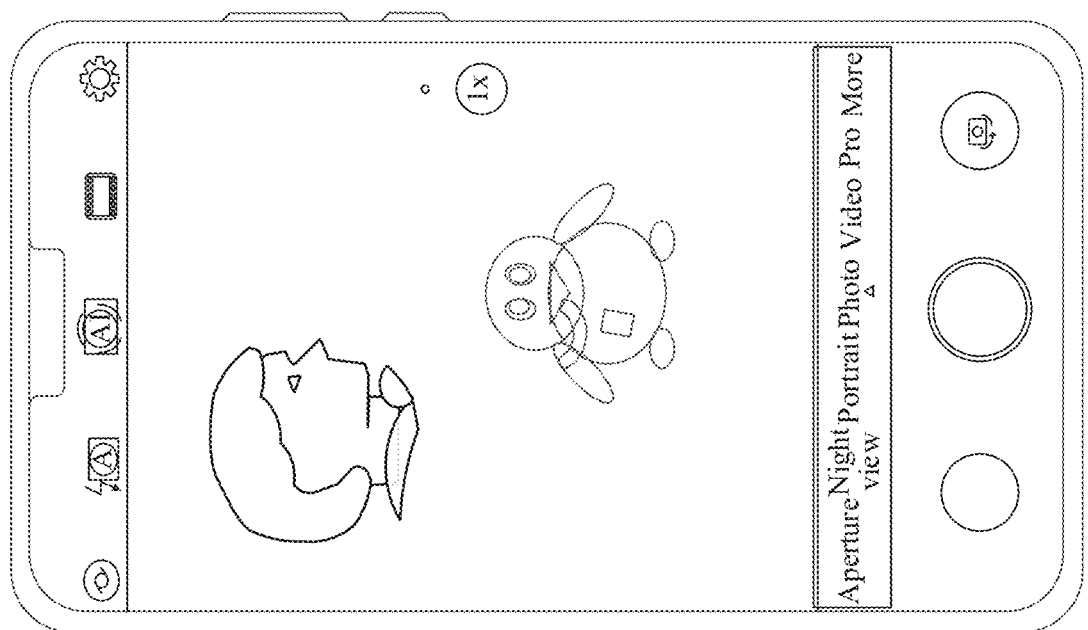
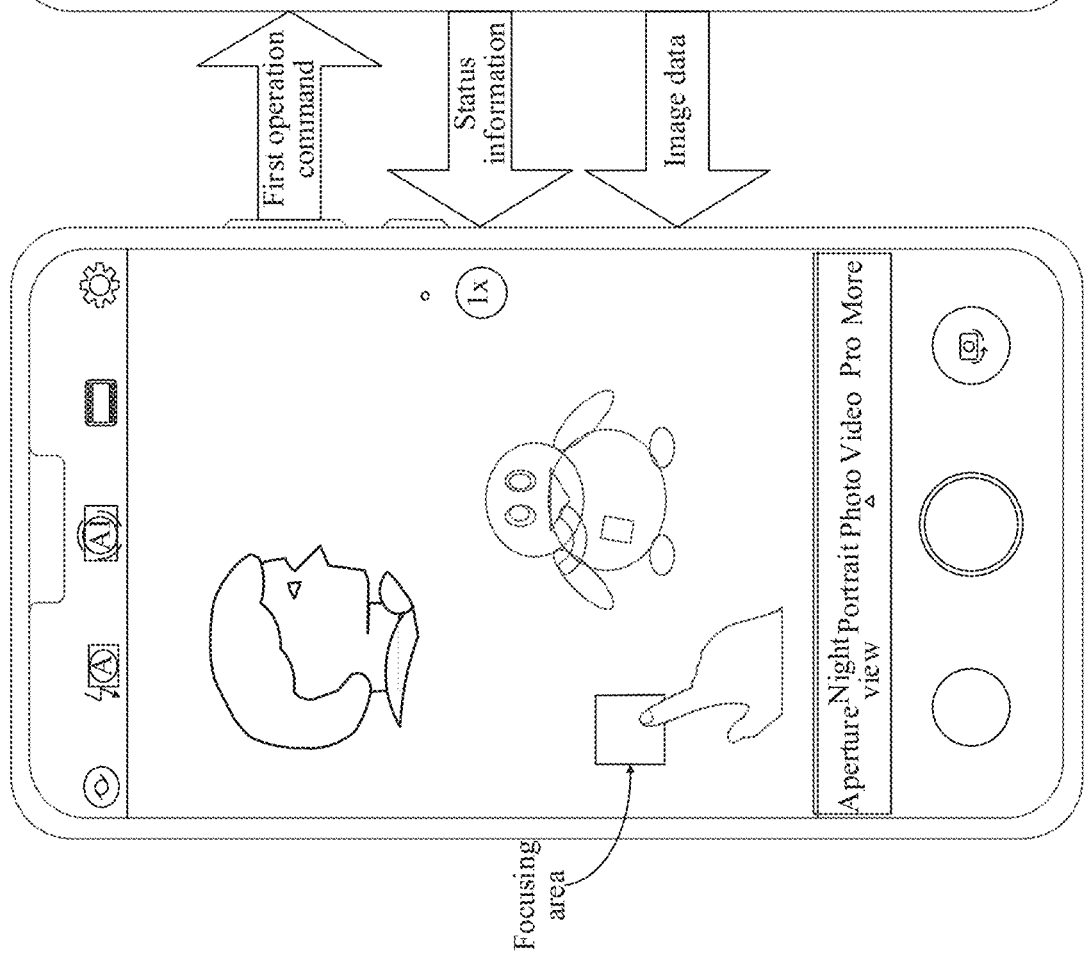
FIG. 4

S61

Determine a target operation command from a plurality of operation commands, where the plurality of operation commands are operation commands with a same operation type that are generated in response to operations for a second terminal device or one or more first terminal devices, and the target operation command is an operation command that corresponds to a largest frame number in the plurality of operation commands

S62

Execute the target operation command, to obtain status information indicating an execution status of the target operation command

FIG. 13

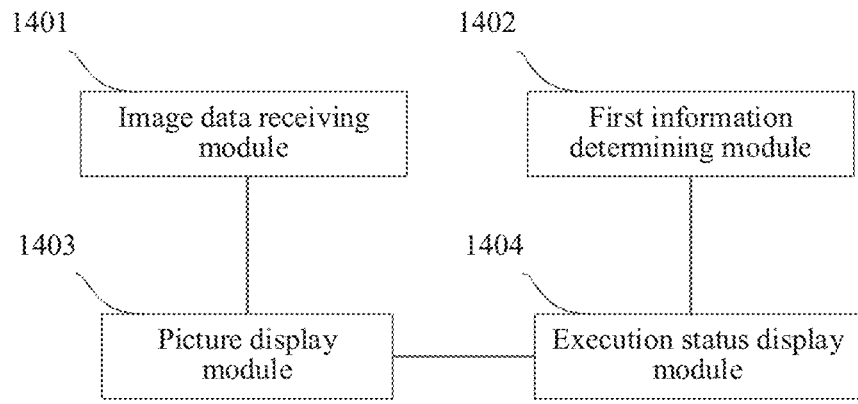

FIG. 14

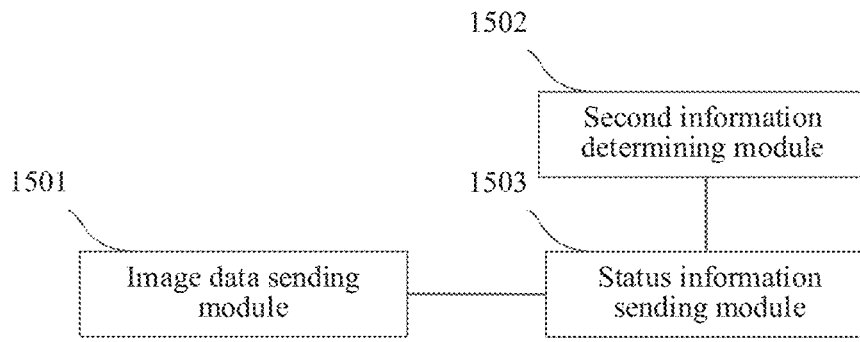

FIG. 15

CAMERA CONTROL METHOD AND APPARATUS, AND STORAGE MEDIUM

CROSS-REFERENCE TO RELATED APPLICATIONS

This is a U.S. National Stage of International Patent Application No. PCT/CN2021/134826 filed on Dec. 1, 2021, which claims priority to Chinese Patent application Ser. No. 202011451138.5 filed on Dec. 9, 2020. All of the aforementioned applications are hereby incorporated by reference in their entireties.

TECHNICAL FIELD

This application relates to the field of electronic devices, and in particular, to a camera control method and apparatus, and a storage medium.

BACKGROUND

With popularization of intelligent terminal devices, a quantity and types of intelligent terminal devices owned by individuals are increasing. Currently, most intelligent terminal devices are equipped with cameras, and a user can take a photo or record a video by using a camera, Therefore, users have a requirement for exchanging camera information.

The rapid development of network technologies in recent years also provides a better hardware support for a distributed application scenario. In an existing application scenario of distributed camera control, only unilateral camera control is generally supported, or control information of cameras cannot be exchanged. In an application scenario of a distributed camera, a more flexible control manner and more convenient user experience are urgently required.

SUMMARY

In view of this, a camera control method and apparatus, and a storage medium are provided.

According to a first aspect, an embodiment of this application provides a camera control method. The method is applied to a first terminal device, and the method includes: receiving image data from a second terminal device, where the image data is captured by the second terminal device in a photographing process; determining an operation command and status information, where the operation command is an operation command for the photographing process of the second terminal device, and the status information indicates an execution status of the operation command executed by the second terminal device; displaying a picture based on the image data; and displaying the execution status of the operation command on the picture based on the operation command and the status information.

According to this embodiment of this application, the first terminal device receives the image data from the second terminal device, determines the operation command and the status information, displays the picture based on the image data, and displays the execution status of the operation command on the picture based on the operation command and the status information. In this way, the first terminal device can implement image synchronization, operation command synchronization and exchange, and status information synchronization and exchange with the second terminal device, so that the two ends can perform cooperative control on the camera, and a user can better understand current status information of a distributed camera, thereby improving control accuracy and user experience.

According to the first aspect, in a first possible implementation of the camera control method, the operation command includes a first operation command generated in response to an operation for the first terminal device; and the determining an operation command and status information includes: sending the first operation command to the second terminal device; and receiving status information that is sent by the second terminal device and that indicates an execution status of the first operation command.

According to this embodiment of this application, the first operation command is sent to the second terminal device, and the status information that is sent by the second terminal device and that indicates the execution status of the first operation command is received. In this way, when the operation command is triggered by the first terminal device, the operation command and the status information are synchronized between cameras of the first terminal device and the second terminal device, so that the first terminal device can control the cameras, and a result and a status are shared. Therefore, camera control in a distributed camera scenario is more flexible and rapid, and control is more accurate.

According to the first aspect, in a second possible implementation of the camera control method, the operation command includes a second operation command generated in response to an operation for the second terminal device; and the determining an operation command and status information includes: receiving the second operation command and the status information that are sent by the second terminal device.

According to this embodiment of this application, the second operation command and the status information that are sent by the second terminal device are received, so that when the operation command is triggered by the second terminal device, the operation command and the status information can be synchronized with those of the first terminal device. In this way, a user of the first terminal device can learn a current status of the camera in real time, and on this basis, an operation on the camera can be implemented, thereby implementing multi-sided information exchange.

According to the first aspect, in a third possible implementation of the camera control method, the determining an operation command and status information includes: receiving status information sent by the second terminal device, where the status information indicates an execution status of a target operation command determined in a plurality of operation commands that is executed by the second terminal device, the plurality of operation commands are operation commands with a same operation type that are generated in response to operations for the second terminal device or one or more first terminal devices, and the target operation command is an operation command that corresponds to a largest frame number in the plurality of operation commands.

According to this embodiment of this application, when a plurality of operation commands triggered among devices conflict, a latest operation command can be responded to, and another party is allowed to cancel a command that is being executed, so that an intention of the user can be correctly selected, and a corresponding operation command can be selected. In this way, when a plurality of parties cooperate, a response is more flexible and rapid, and a multi-sided command can be mutually canceled and updated, thereby improving user experience.

According to the first aspect or the first, second or third possible implementation of the first aspect, in a fourth possible implementation of the camera control method, an operation type of the operation command includes one or more of focusing, zooming, turning on or off a flash, adjusting exposure, using a filter, beautifying, and skin smoothing.

According to this embodiment of this application, operations that can be performed on an image on the first terminal device can be enriched, and a distributed camera control scenario can be implemented by using interface displays of the first terminal device and the second terminal device, so that user experience is better.

According to a second aspect, an embodiment of this application provides a camera control method. The method is applied to a second terminal device, and the method includes: sending image data to a first terminal device, where the image data is captured by the second terminal device in a photographing process; determining an operation command and status information, where the operation command is an operation command for the photographing process of the second terminal device, and the status information indicates an execution status of the operation command executed by the second terminal device; and sending the status information to the first terminal device.

According to this embodiment of this application, the second terminal device sends the image data to the first terminal device, determines the operation command and the status information, and sends the status information to the first terminal device. In this way, an image, an operation command, and status information of a multi-sided device can be synchronized and exchanged, so that a peer end can also perform cooperative control on a camera, and distributed camera control can be implemented.

According to the second aspect, in a first possible implementation of the camera control method, the operation command includes a first operation command generated in response to an operation for the first terminal device; and the determining an operation command and status information includes: receiving the first operation command sent by the first terminal device; and executing the first operation command, to obtain status information indicating an execution status of the first operation command.

According to this embodiment of this application, the first operation command sent by the first terminal device is received, and the first operation command is executed, to obtain the status information indicating the execution status of the first operation command. In this way, when the operation command is triggered by the first terminal device, the operation command can be synchronized and the command can be executed, thereby implementing controlling on a camera performed by the multi-sided device. By performing multi-sided synchronization on the execution status after execution, a user of the multi-sided device can intuitively learn a current status of the camera, thereby facilitating a subsequent operation performed by the user, making control more accurate, and improving user experience.

According to the second aspect, in a second possible implementation of the camera control method, the determining an operation command and status information includes: generating a second operation command in response to an operation for the second terminal device; and executing the second operation command, to obtain status information indicating an execution status of the second operation command.

According to this embodiment of this application, the second operation command is generated in response to the operation for the second terminal device, and the second operation command is executed to obtain the status information indicating the execution status of the second operation command. In this way, when the operation command is triggered by the second terminal device, the operation command is executed to obtain corresponding status information, to synchronize the status information to the multi-sided device, so that the multi-sided device can perform cooperative control on the camera.

According to the second aspect, in a third possible implementation of the camera control method, the determining an operation command and status information includes: determining a target operation command from a plurality of operation commands, where the plurality of operation commands are operation commands with a same operation type that are generated in response to operations for the second terminal device or one or more first terminal devices, and the target operation command is an operation command that corresponds to a largest frame number in the plurality of operation commands; and executing the target operation command, to obtain status information indicating an execution status of the target operation command.

According to this embodiment of this application, when a plurality of triggered operation commands conflict, the second terminal device may execute a latest operation command by using a concurrent response policy, and a peer side is allowed to cancel a command that is being executed, so that an intention of the user can be correctly selected, and a corresponding operation command can be selected. In this way, when a plurality of parties cooperate, a response is more flexible and rapid, and a multi-sided command can be mutually canceled and updated, thereby improving user experience.

According to the second aspect or the first, second or third possible implementation of the second aspect, in a fourth possible implementation of the camera control method, an operation type of the operation command includes one or more of focusing, zooming, turning on or off a flash, adjusting exposure, using a filter, beautifying, and skin smoothing.

According to this embodiment of this application, operations that can be performed on an image on the second terminal device can be enriched, and a distributed camera control scenario can be implemented by using interface displays of the first terminal device and the second terminal device, so that user experience is better.

According to a third aspect, an embodiment of this application provides a camera control apparatus. The apparatus is used in a first terminal device, and the apparatus includes: an image data receiving module, configured to receive image data from a second terminal device, where the image data is captured by the second terminal device in a photographing process; a first information determining module, configured to determine an operation command and status information, where the operation command is an operation command for the photographing process of the second terminal device, and the status information indicates an execution status of the operation command executed by the second terminal device; a picture display module, configured to display a picture based on the image data; and an execution status display module, configured to display the execution status of the operation command on the picture based on the operation command and the status information.

According to the third aspect, in a first possible implementation of the camera control apparatus, the operation command includes a first operation command generated in response to an operation for the first terminal device; and the first information determining module includes: a first operation command sending submodule, configured to send the first operation command to the second terminal device; and a first information receiving submodule, configured to receive status information that is sent by the second terminal device and that indicates an execution status of the first operation command.

According to the third aspect, in a second possible implementation of the camera control apparatus, the operation command includes a second operation command generated in response to an operation for the second terminal device; and the first information determining module includes a second information receiving submodule, configured to receive the second operation command and the status information that are sent by the second terminal device.

According to the third aspect, in a third possible implementation of the camera control apparatus, the first information determining module includes: a status information receiving submodule, configured to receive status information sent by the second terminal device, where the status information indicates an execution status of a target operation command determined in a plurality of operation commands that is executed by the second terminal device, the plurality of operation commands are operation commands with a same operation type that are generated in response to operations for the second terminal device or one or more first terminal devices, and the target operation command is an operation command that corresponds to a largest frame number in the plurality of operation commands.

According to the third aspect or the first, second or third possible implementation of the third aspect, in a fourth possible implementation of the camera control apparatus, an operation type of the operation command includes one or more of focusing, zooming, turning on or off a flash, adjusting exposure, using a filter, beautifying, and skin smoothing.

According to a fourth aspect, an embodiment of this application provides a camera control apparatus. The apparatus is used in a second terminal device, and the apparatus includes: an image data sending module, configured to send image data to a first terminal device, where the image data is captured by the second terminal device in a photographing process; a second information determining module, configured to determine an operation command and status information, where the operation command is an operation command for the photographing process of the second terminal device, and the status information indicates an execution status of the operation command executed by the second terminal device; and a status information sending module, configured to send the status information to the first terminal device.

According to the fourth aspect, in a first possible implementation of the camera control apparatus, the operation command includes a first operation command generated in response to an operation for the first terminal device; and the second information determining module includes: an operation command receiving submodule, configured to receive the first operation command sent by the first terminal device; and a first operation command execution submodule, configured to execute the first operation command, to obtain status information indicating an execution status of the first operation command.

According to the fourth aspect, in a second possible implementation of the camera control apparatus, the second information determining module includes: an operation command generation submodule, configured to generate a second operation command in response to an operation for the second terminal device; and a second operation command execution submodule, configured to execute the second operation command, to obtain status information indicating an execution status of the second operation command.

According to the fourth aspect, in a third possible implementation of the camera control apparatus, the second information determining module includes: a target operation command determining submodule, configured to determine a target operation command from a plurality of operation commands, where the plurality of operation commands are operation commands with a same operation type that are generated in response to operations for the second terminal device or one or more first terminal devices, and the target operation command is an operation command that corresponds to a largest frame number in the plurality of operation commands; and a target operation command execution submodule, configured to execute the target operation command, to obtain status information indicating an execution status of the target operation command.

According to the fourth aspect or the first, second or third possible implementation of the fourth aspect, in a fourth possible implementation of the camera control method, an operation type of the operation command includes one or more of focusing, zooming, turning on or off a flash, adjusting exposure, using a filter, beautifying, and skin smoothing.

According to a fifth aspect, an embodiment of this application provides a camera control apparatus. The apparatus includes: a processor; and a memory configured to store processor-executable instructions. When executing the instructions, the processor is configured to implement the camera control method according to the first aspect or one or more of the plurality of possible implementations of the first aspect, or implement the camera control method according to the second aspect or one or more of the plurality of possible implementations of the second aspect.

According to a sixth aspect, an embodiment of this application provides a non-volatile computer readable storage medium, storing computer program instructions. When the computer program instructions are executed by a processor, the camera control method according to the first aspect or one or more of the plurality of possible implementations of the first aspect is implemented, or the camera control method according to the second aspect or one or more of the plurality of possible implementations of the second aspect is implemented.

According to a seventh aspect, an embodiment of this application provides a terminal device. The terminal device may perform the camera control method according to the first aspect or one or more of the plurality of possible implementations of the first aspect, or perform the camera control method according to the second aspect or one or more of the plurality of possible implementations of the second aspect.

According to an eighth aspect, an embodiment of this application provides a computer program product, including computer readable code or a non-volatile computer readable storage medium that includes the computer readable code. When the computer readable code runs in an electronic device, a processor in the electronic device performs the camera control method according to the first aspect or one or more of the plurality of possible implementations of the first aspect, or performs the camera control method according to the second aspect or one or more of the plurality of possible implementations of the second aspect.

These aspects and other aspects of this application are more concise and understandable in descriptions of the following (a plurality of) embodiments.

BRIEF DESCRIPTION OF DRAWINGS

Accompanying drawings included in the specification and constructing a part of the specification, together with the specification, jointly show exemplary embodiments, features, and aspects of this application and are intended to explain the principles of this application.

FIG. 4 is a schematic interface diagram of a camera control method according to an embodiment of this application;

FIG. 13 is a flowchart of a camera control method according to an embodiment of this application;

FIG. 14 is a structural diagram of a camera control apparatus according to an embodiment of this application;

FIG. 15 is a structural diagram of a camera control apparatus according to an embodiment of this application;

DESCRIPTION OF EMBODIMENTS

Figure 1:
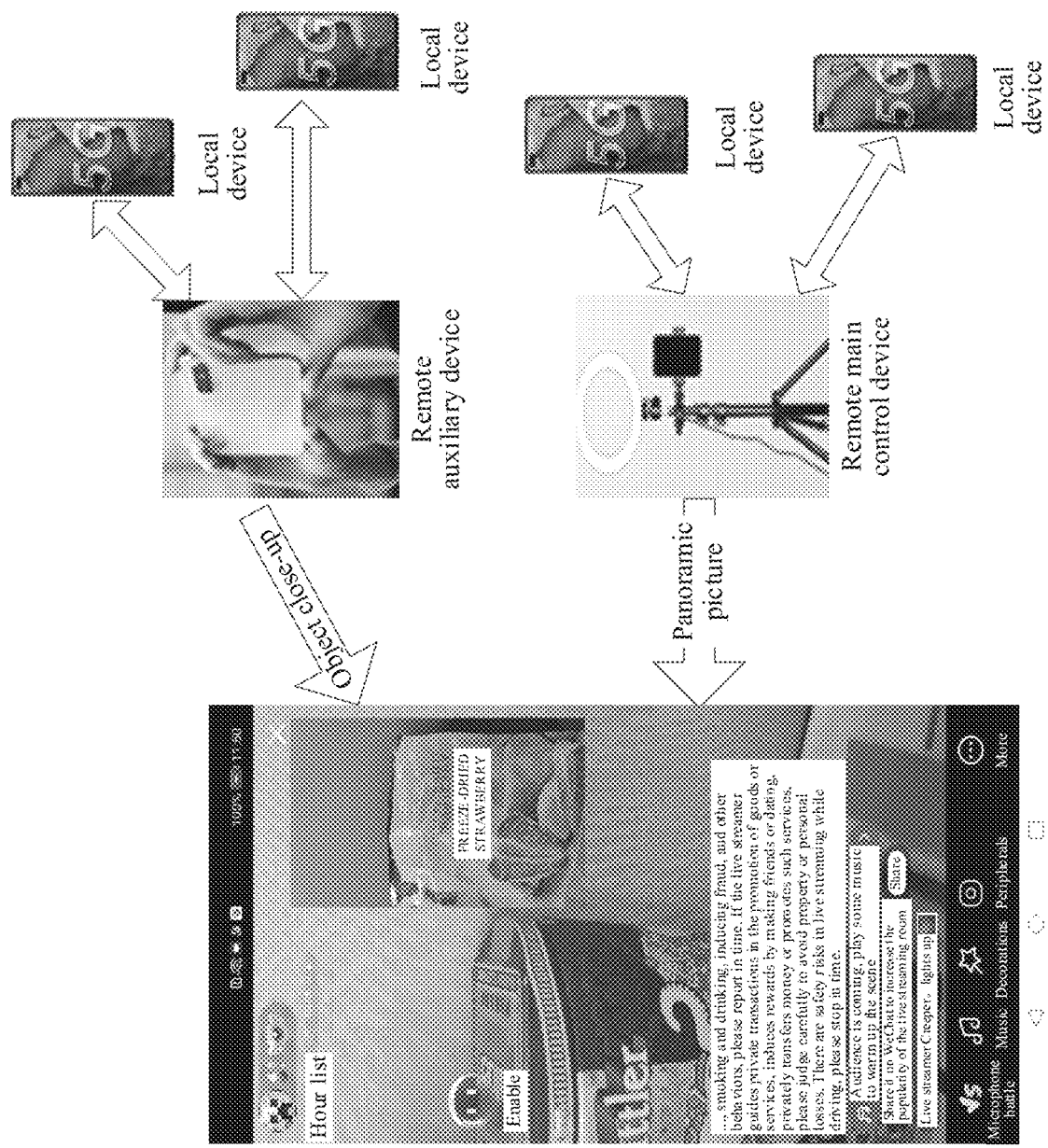
FIG. 1 is a schematic diagram of an application scenario according to an embodiment of this application.

Various exemplary embodiments, features, and aspects of this application are described in detail below with reference to the accompanying drawings. Same reference numerals in the accompanying drawings indicate elements having same or similar functions. Although various aspects of embodiments are shown in the accompanying drawings, the accompanying drawings are not necessarily drawn in proportion unless otherwise specified.

The specific term "exemplary" herein means "used as an example, an embodiment or an illustration". Any embodiment described herein as "exemplary" is not necessarily explained as being superior to or better than other embodiments.

In addition, to better describe this application, numerous specific details are provided in the Mowing specific implementations. A person skilled in the art should understand that this application can also be implemented without some specific details. In some embodiments, a method, a means, an element, and a circuit well known to a person skilled in the art are not described in detail, to highlight a theme of this application.

For an application of a distributed camera of a terminal device, a camera control manner in the conventional technologies is usually unilateral. On a basis of device interworking, a local device invokes a camera application of a remote device, but cannot remotely control the camera, and an operation command can be triggered only on the remote device. A problem brought by this is that an operation command can be triggered only in a single-sided device, and cooperative control of the distributed camera cannot be supported. In another method in the conventional technologies, after invoking the camera application of the remote device, the local device shares preview data of the remote device. The local device supports a small number of camera operation commands in a remote management manner, the camera application of the remote device acts for the operation commands, and then the operation commands are delivered to a camera system. Such a method is actually exclusive control, and is not real control over a remote device camera. A problem of the method is that after a command is executed by the remote device, status information of the remote device cannot be synchronized to the local device, and information of the remote device and information of the local device cannot be exchanged. As a result, precise synchronization cannot be implemented in the cooperative control, which brings inconvenience to a user during use.

To resolve the foregoing technical problems, an embodiment of this application provides a camera control method. The camera control method in this embodiment of this application can implement interworking between a first terminal device and a second terminal device. The first terminal device receives image data from the second terminal device, and determines an operation command and status information. In this way, a picture and an execution status of the operation command may be displayed, to implement information synchronization and exchange. In addition, the first terminal device may also send the operation command to the second terminal device, to implement cooperative control between devices. According to this embodiment of this application, camera control performed by a plurality of first terminal devices on a same second terminal device may be supported, and camera sharing control is truly implemented. For a command on a device, devices may perceive each other, a command execution result may be shared among the devices, and concurrent triggering of commands by the devices is supported. Through a cooperation mechanism, an intention of the user can be correctly understood. Concurrent commands among devices can be mutually canceled and updated. A response speed is quick, being more flexible and quicker, thereby bringing more convenient user experience to the user.

FIG. 1 is a schematic diagram of an application scenario according to an embodiment of this application. In a possible implementation, the camera control method provided in this embodiment of this application may be applied to a live streaming scenario that includes a first terminal device and a second terminal device. The live streaming scenario may include an e-commerce live streaming scenario, an education live streaming scenario, or the like. The first terminal device and the second terminal device may be devices with a wireless connection function, and the wireless connection function means that mutual connection may be performed in a short-distance wireless connection manner such as wireless fidelity (Wi-Fi, Wireless Fidelity) or Bluetooth, or the mutual connection may be performed in a long-distance wireless connection manner such as a general packet radio service (GPRS, General Packet Radio Service)/code division multiple access (CDMA, Code Division Multiple Access), data transmission radio, spread spectrum microwave, satellite communication, or mobile communication. The foregoing terminal devices may also have a wired connection function for communication. The first terminal device and the second terminal device in embodiments of this application may be terminal devices of a same type, or may be terminal devices of different types, which may be touchscreen, may be non-touchscreen, or may have no screen. For a touchscreen terminal device, the terminal device may be controlled by tapping or sliding on a displayed screen by using a finger, a stylus, or the like. For a non-touchscreen terminal device, the terminal device may be connected to an input device such as a mouse, a keyboard, or a touch panel, and may be controlled by using the input device. A terminal device without a screen may be, for example, a Bluetooth speaker without a screen. For example, the terminal device in this application may be a smartphone, a net book, a tablet computer, a notebook computer, a television (TV, television), or a virtual reality device. A type of the live streaming and a type of the terminal device herein are not limited in this application, and embodiments of this application may also be applied to another application scenario other than the live streaming.

An application scenario in which live streaming is performed by using a local device that serves as a first terminal device and a remote auxiliary device and a remote main control device that serve as second terminal devices is used as an example below for description. A person skilled in the art should understand that embodiments of this application are not limited to such an application scenario.

As shown in FIG. 1, the camera control method provided in this embodiment of this application may be applied to a live streaming scenario. For example, in a process in which a live streamer performs an e-commerce live streaming, the live streamer may photograph a panoramic picture in the live streaming scenario by using a camera of a remote main control device, and may further photograph a close-up picture of an object in the live streaming scenario, for example, a close-up picture of a to-be-sold commodity by using a remote auxiliary device. On a user end of a user who watches the live streaming, the live streaming scenario may be presented in a "picture-in-picture" manner. On a same interface, the user can view both the panoramic picture when the live streamer performs the live streaming and the close-up picture of the to-be-sold commodity. In a possible implementation, the remote main control device may be connected to one or more local devices, and the remote auxiliary device may also be connected to one or more local devices. According to the camera control method in this embodiment of this application, commands and status information of cameras among a plurality of devices are synchronized. On one or more local devices, a staff member may help the live streamer control the panoramic picture photographed by a camera lens of the camera of the remote main control device, and the live streamer and the staff member may jointly operate the panoramic picture. On another one or more local devices, the staff member may also help the live streamer control the object close-up picture photographed by a camera lens of the camera of the remote auxiliary device, and the live streamer and the staff member may also jointly operate the close-up picture. For example, the staff member may tap, on a local device connected to the remote main control device, a location of the shared panoramic picture, to trigger a focusing operation. The operation command may be synchronized to the remote main control device. In a focusing process of the remote main control device, an execution status may be displayed on the remote main control device and each local device connected to the remote main control device, to implement cooperative control among devices. The remote auxiliary device and the local devices connected to the remote auxiliary device are similarly shown. According to the camera control method provided in this embodiment of this application, an operation intention of a user of each device who performs a cooperative operation can be correctly understood, so that control of connected cameras in an application scenario is more flexible and convenient.

Figure 2:
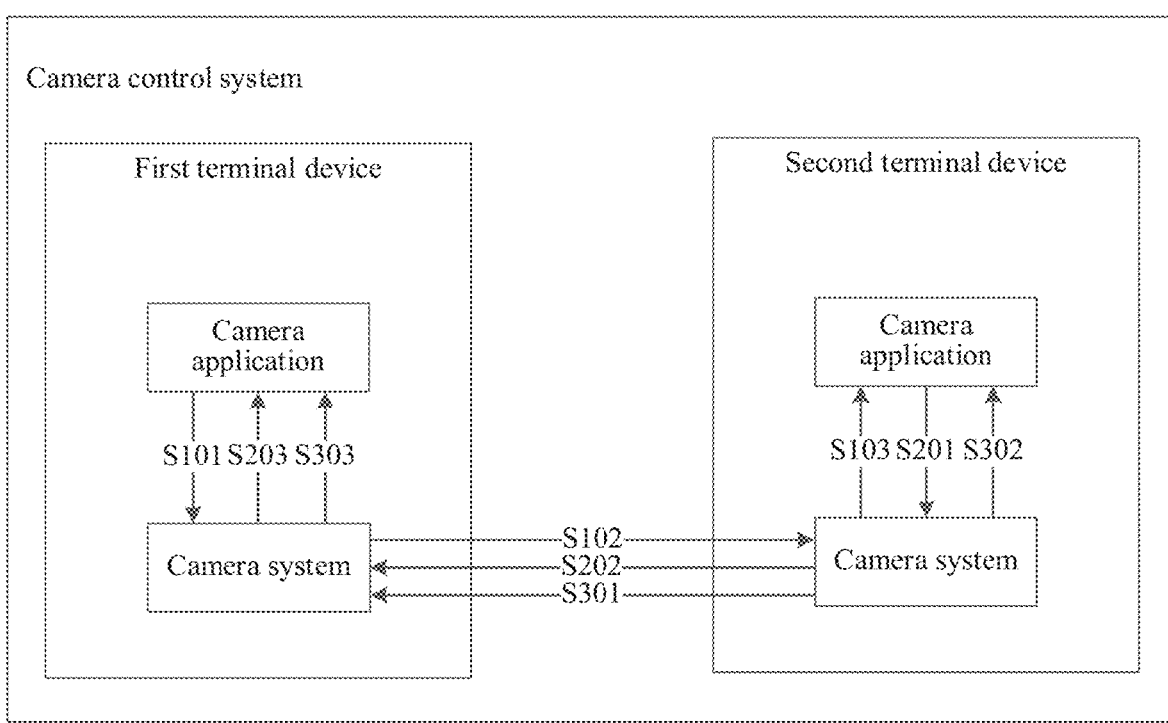
FIG. 2 is a flowchart of a camera control method according to an embodiment of this application.

FIG. 2 is a flowchart of a camera control method according to an embodiment of this application. As shown in FIG. 2, a camera control system may include a first terminal device and a second terminal device. The first terminal device may include a camera application and a camera system that are connected to each other, and the second terminal device may also include a camera application and a camera system that are connected to each other. The camera application may be configured to display, on the first terminal device or the second terminal device, a picture corresponding to image data, or may be configured to generate a corresponding operation command based on an operation of a user. The camera system may be configured to store data such as related information of an image frame, an attribute of a camera, and a parameter of the camera, or may be configured to process the image data in the first terminal device or the second terminal device based on the operation command. It should be noted that, in this embodiment of this application, a quantity of first terminal devices and a quantity of second terminal devices are not limited. Division, functions, and communication manners of modules of the first terminal device and the second terminal device shown in FIG. 2 are merely examples. This is not limited in this embodiment of this application.

An operation type of the operation command is not limited in this embodiment of this application. An application scenario of a focusing operation and an application scenario of a zooming operation are used as examples for description below. A person skilled in the art should understand that this embodiment of this application is not limited to such application scenarios.

In an exemplary application scenario, a user A may use the second terminal device to perform photographing (for example, taking a photo or shooting a video), and a user B may synchronously view, through the first terminal device, a preview picture in a photographing process of the user A, and perform a photographing operation on a displayed image. An operation command of the photographing operation is sent to the second terminal device, and the second terminal device executes the operation command, and returns status information of an execution status of the operation command to the first terminal device, so that the execution status is also displayed on the first terminal device. In this way, the first terminal device can synchronously reflect a picture and a status in a photographing process of the second terminal device, and the user B can also perform precise control on the second terminal device.

In this application scenario, as shown in FIG. 2, a procedure of the camera control method according to this embodiment of this application includes the following steps.

Step S101: A camera application of the first terminal device sends the operation command to a camera system of the first terminal device.

The camera system of the first terminal device may be connected to a camera system of the second terminal device, to mutually send and receive image data, an operation command, and execution status information. An operation type of the operation command may include one or more of focusing, zooming, turning on or off a flash, adjusting exposure, using a filter, beautifying, and skin smoothing. The operation type of the operation command is not limited herein.

For example, a user taps a location on an interface of the camera application of the first terminal device, and generation of a focusing operation command at the location may be triggered. In this case, correspondingly, the focusing operation command may include an operation type (a focusing operation), an operation area (an area that is tapped), and an operation mode (manual focusing), and may further include a frame number of an image corresponding to the operation command. The camera application of the first terminal device may deliver the focusing operation command to the camera system of the first terminal device.

Step S102: The camera system of the first terminal device sends the operation command to the camera system of the second terminal device, and executes the operation command in the camera system of the second terminal device.

That the camera system of the second terminal device executes the operation command may include controlling a camera based on the operation command, changing the image data, and sending the image data to a camera application of the second terminal device, and may further generate execution status information based on an execution status of the operation command.

Before the operation command is executed in the camera system of the second terminal device, if two operation commands of a same type exist within a predetermined time interval, the camera system of the second terminal device may compare frame numbers of images corresponding to the two operation commands, execute an operation command with a larger corresponding frame number, and cancel an operation command with a smaller corresponding frame number, to correctly understand an operation intention of the user and preferentially respond to a new operation command of the user.

The predetermined time interval may be determined based on a current quantity of frames output per second of the camera system of the second terminal device. For example, when it is 30 frames per second, the predetermined time interval may be 100/3 milliseconds. The frame number indicates a number of image frames.

For example, after the focusing operation command sent by the camera system of the first terminal device is received, when no operation commands of a same focusing type exist within the predetermined time interval, the camera system of the second terminal device may execute the focusing command, change a related parameter, generate the image data, and display a corresponding picture in the camera application of the second terminal device.

Step S103: The camera system of the second terminal device sends the operation command to the camera application of the second terminal device.

The camera application of the second terminal device may display, on the second terminal device, a picture corresponding to the image data, and after receiving the operation command, the camera application of the second terminal device may display, on the second terminal device, related information of an operation command that is being executed.

For example, after receiving the focusing command sent by the camera system of the second terminal device, the camera application of the second terminal device may display, at a corresponding location, related information (for example, highlight a benchmarked operation icon, or display a manually benchmarked location) of the current focusing command so that a user using the second terminal device may synchronously know which operation command is currently executed.

Step S301: The camera system of the second terminal device sends the execution status information to the camera system of the first terminal device.

The execution status information may indicate the execution status corresponding to the operation command.

For example, in a process of executing the focusing command, the camera system of the second terminal device may separately generate a focusing start status, a focusing in progress status, and a focusing completed status. The camera system of the second terminal device may separately send status information corresponding to the three statuses to the camera system of the first terminal device.

In a possible implementation, when the camera system of the second terminal device receives, within the predetermined time interval, a plurality of operation commands of a same operation type, and determines to execute an operation command corresponding to a larger frame number, for example, determines to execute an operation command triggered by the camera application of the second terminal device, an operation command triggered by the camera application of the first terminal device is canceled. When the camera system of the second terminal device sends the execution status information to the camera system of the first terminal device, status information of an execution status corresponding to executing the operation command triggered by the camera application of the second terminal device is sent.

Step S302: The camera system of the second terminal device sends the execution status information to the camera application of the second terminal device.

The execution status information corresponds to an operation command actually executed by the camera system of the second terminal device. After the camera system of the second terminal device sends the execution status information to the camera application of the second terminal device, the execution status information corresponding to the actually executed operation command may be synchronized on the camera application of the second terminal device.

For example, after the camera system of the second terminal device generates a twice-zooming status in a process of executing a zooming command, after the camera application of the second terminal device receives status information of the twice-zooming status, the status information may be displayed on the camera application of the second terminal device.

Step S303: The camera system of the first terminal device sends the execution status information to the camera application of the first terminal device.

The execution status information corresponds to the operation command actually executed by the camera system of the second terminal device, After the camera system of the first terminal device sends the execution status information to the camera application of the first terminal device, the execution status information corresponding to the actually executed operation command may be synchronized on the camera application of the first terminal device.

For example, after the camera system of the second terminal device generates the twice-zooming status in the process of executing the zooming command, after the camera application of the first terminal device receives the status information of the twice-zooming status, the status information may be displayed on the camera application of the first terminal device.

In an exemplary application scenario, a user A may use the second terminal device to perform photographing (for example, taking a photo or shooting a video), and a user B may synchronously view, through the first terminal device, a preview picture in a photographing process of the user A. When the user A performs a photographing operation on the second terminal device for a displayed image, an operation command of the photographing operation is synchronized to the first terminal device. After executing the operation command, the second terminal device may further return status information of an execution status of the operation command to the first terminal device, so that the execution status is also displayed on the first terminal device. In this way, the first terminal device can synchronously reflect a picture and a status in a photographing process of the second terminal device, and the user A and the user B can simultaneously perform precise control on a photographed picture.

In this application scenario, as shown in FIG. 2, a procedure of the camera control method according to this embodiment of this application includes the following steps.

Step S201: A camera application of the second terminal device sends the operation command to a camera system of the second terminal device.

For example, a user may tap "twofold magnification", on a zooming icon on an interface of the camera application of the second terminal device, and generation of a zooming operation command may be triggered. In this case, correspondingly, the operation command may include an operation type (a zooming operation) and a zooming multiple (twofold magnification), and may further include a frame number of an image corresponding to the operation command. In a possible implementation, related information (for example, a zooming icon and an identifier of a zooming multiple) of a currently executed operation command may be displayed on the interface of the camera application of the second terminal device. The camera application of the second terminal device may deliver the zooming operation command to the camera system of the second terminal device.

Step S202: Execute the operation command in the camera system of the second terminal device, and send the operation command to a camera system of the first terminal device.

Before the operation command is executed in the camera system of the second terminal device, if two operation commands of a same type exist within a predetermined time interval, the camera system of the second terminal device may compare frame numbers of images corresponding to the two operation commands, execute an operation command with a larger corresponding frame number, and cancel an operation command with a smaller corresponding frame number, to correctly understand an operation intention of the user and preferentially respond to a new operation command of the user.

For example, after the zooming command sent by the camera system of the second terminal device is received, when no operation commands of a same zooming type exist within the predetermined time interval, the camera system of the second terminal device may execute the zooming command, change a related parameter, generate image data, and display a corresponding picture in the camera application of the second terminal device. To implement synchronization of command information between the first terminal device and the second terminal device, the camera system of the second terminal device may send an operation command to the camera system of the first terminal device.

Step S203: The camera system of the first terminal device sends the operation command to the camera application of the first terminal device.

For example, after receiving the zooming command sent by the camera system of the first terminal device, the camera application of the first terminal device may display, at a corresponding location, related information of the current zooming command, so that a user using the first terminal device may synchronously know a currently executed operation command.

Step S301: The camera system of the second terminal device sends the execution status information to the camera system of the first terminal device.

Step S302: The camera system of the second terminal device sends the execution status information to the camera application of the second terminal device.

Figure 3:
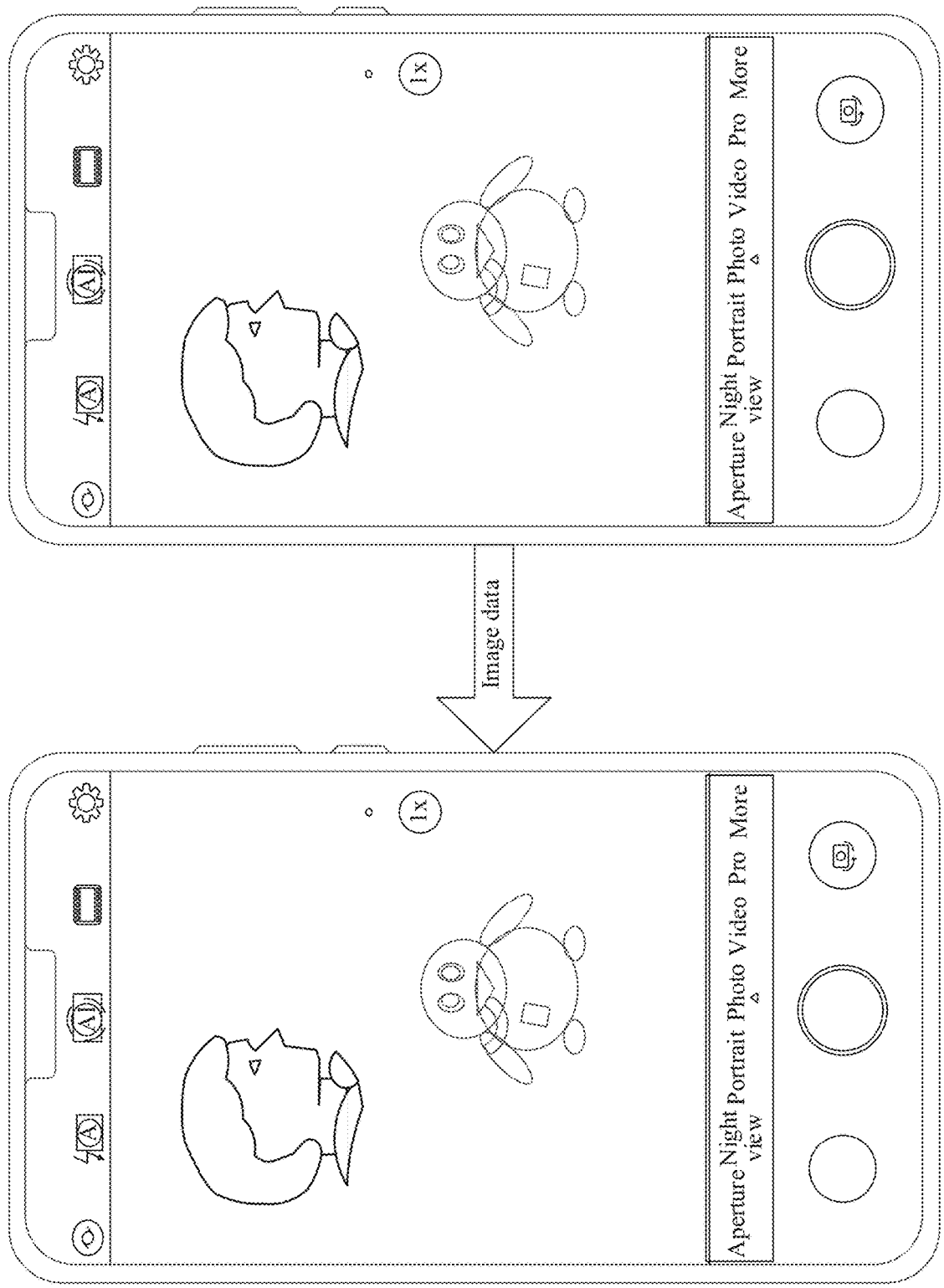
FIG. 3 is a schematic interface diagram of a camera control method according to an embodiment of this application.

Step S303: The camera system of the first terminal device sends the execution status information to the camera application of the first terminal device. FIG. 3 is a schematic interface diagram of a camera control method according to an embodiment of this application. As shown in FIG. 3, in a photographing process of a second terminal device, after a camera captures image data, the image data may be sent to a first terminal device in real time, so that the first terminal device and the second terminal device synchronously display a photographing preview picture of the second terminal device. A user may also perform an operation on the first terminal device and/or the second terminal device to trigger a corresponding operation command.

FIG. 4 is a schematic interface diagram of a camera control method according to an embodiment of this application. As shown in FIG. 4, a user may tap on an image of a first terminal device to trigger a focusing operation command. The first terminal device may send the focusing operation command to a second terminal device, and the second terminal device executes the command. After executing the command, the second terminal device generates a corresponding execution status. For a focusing operation, the corresponding execution statuses may include focusing started, focusing in progress, and focusing completed. The second terminal device may separately send the three execution statuses to the first terminal device, and display the three execution statuses on the first terminal device and the second terminal device.

For example, corresponding to the execution status of focusing started, square boxes as shown e figure may be displayed in corresponding areas of the images of the first terminal device and the second terminal device, indicating focusing areas, and the square boxes are displayed in white to indicate that focusing starts. Corresponding to the execution status of focusing in progress, the square boxes may be displayed in a zoomed manner, to indicate that a focusing operation is currently being performed. Corresponding to the execution status of focusing completed, there may be two cases: focusing success and focusing failure. In a case of focusing success, the square boxes may be displayed in yellow, and in a case of focusing failure, the square boxes may be displayed in red.

In a process of performing the focusing operation, the second terminal device may send image data to the first terminal device in real time. The first terminal device and the second terminal device may synchronously display a picture change that is clearer after the focusing operation is performed on a local area in a photographing preview picture.

Figure 5:
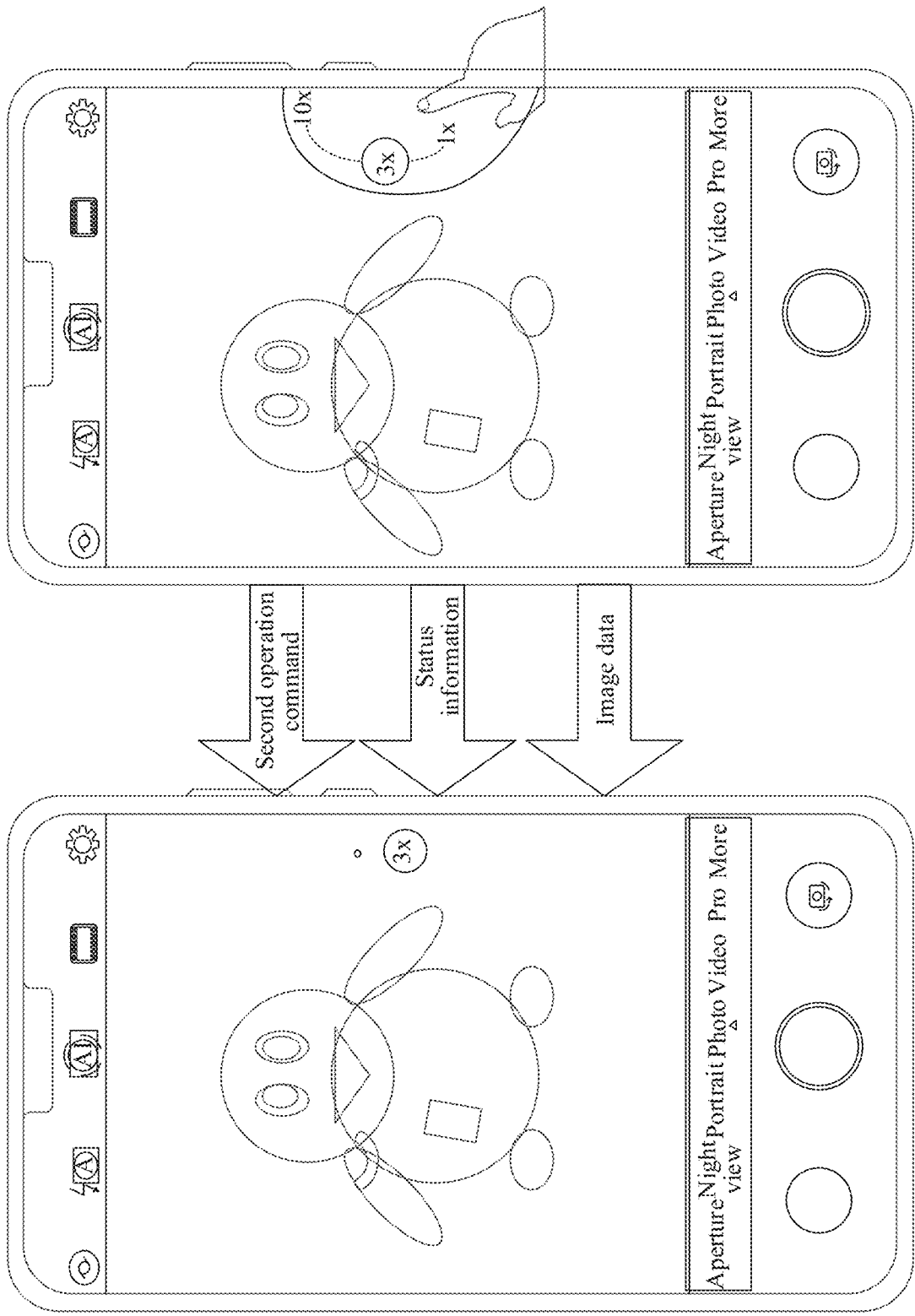
FIG. 5 is a schematic interface diagram of a camera control method according to an embodiment of this application.

FIG. 5 is a schematic interface diagram of a camera control method according to an embodiment of this application. As shown in FIG. 5, a user may tap a zooming icon on a second terminal device, and select a multiple needed for magnification, for example, threefold magnification, to trigger a zooming operation command. The second terminal device may execute the zooming operation command, and synchronize the zooming operation command to a first terminal device. The first terminal device may perform display on an interface, for example, change the zooming icon to "3×" as shown in the figure. After executing the command for the threefold magnification, the second terminal device may generate status information of an execution status that the threefold magnification is completed, and may send the status information to the first terminal device. The first terminal device may perform display on the interface based on the status information.

In a possible implementation, the second terminal device receives, within a predetermined time interval, only one command whose operation type is zooming, and the first terminal device magnifies the image by three times when receiving the zooming operation command and receiving the status information. If the second terminal device receives, within the predetermined time interval, two commands whose operation types are zooming, for example, one being a command triggered by the second terminal device to magnify an image whose frame number is 30 by three times, and the other being a command triggered by the first terminal device to magnify an image whose frame number is 25 by two times, a command corresponding to a larger frame number, namely, the command of threefold magnification, is executed. For the first terminal device, before status information indicating that the threefold magnification is completed is received, the command of twofold magnification, for example, "2×", may be displayed. After the status information indicating that the threefold magnification is completed is received, status information of the threefold magnification, for example, "3×", may be displayed.

In a process of performing the zooming operation, the second terminal device may send image data to the first terminal device in real time. The first terminal device and the second terminal device may synchronously display a photographing preview picture that is magnified or minified after the zooming operation.

Figure 6:
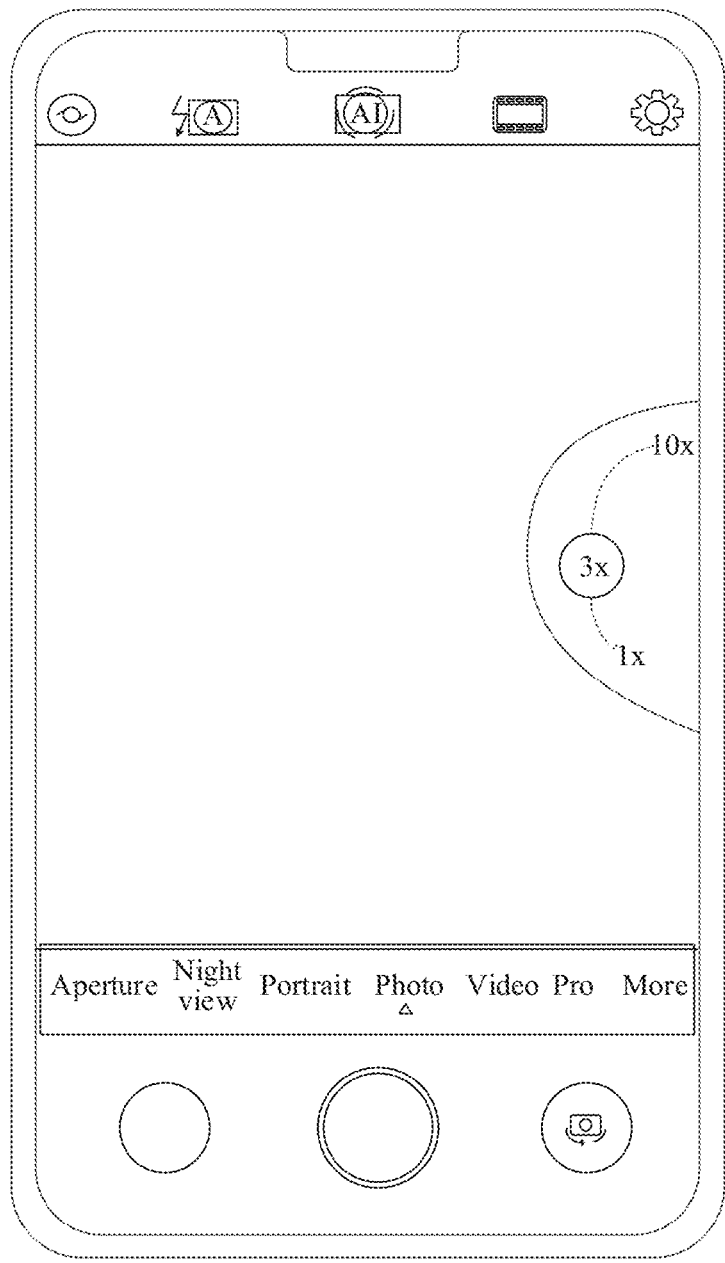
FIG. 6 is a schematic interface diagram of a camera application according to an embodiment of this application.
Figure 7:
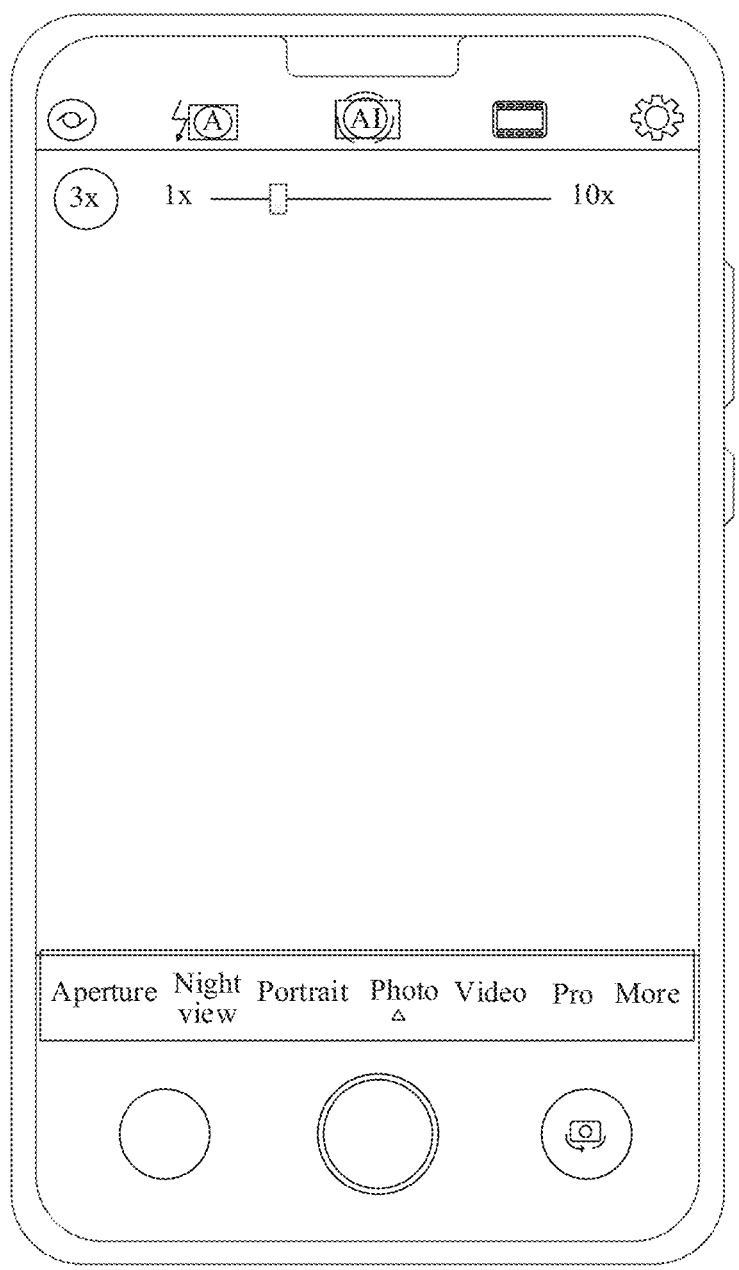
FIG. 7 is a schematic interface diagram of a camera application according to an embodiment of this application.

FIG. 6 and FIG. 7 are schematic interface diagrams of a camera application according to an embodiment of this application. The following interfaces may be used in a first terminal device, or may be used in a second terminal device. A person skilled in the art should understand that this embodiment of this application is not limited to such an application scenario. As shown in FIG. 6, an upper part of the interface may include icons for performing operations such as metering, turning on or off a flash, selecting a color mode, and setting. A camera mode may be selected at a lower part of the interface, and may include aperture, night view, portrait, photo, video, pro, and more camera modes.

In a possible implementation, as shown in the figure, an operation for triggering zooming may be performed on a right side of an interface of a terminal device. A zooming multiple, for example, any value from 1 time to 10 times, may be selected from a semicircular box by tapping an operation icon for zooming. After a user selects the zooming multiple, a current zooming multiple may be displayed in the operation icon.

FIG. 7 is a schematic interface diagram of a camera application according to an embodiment of this application. As shown in FIG. 7, an upper part of the interface may include icons for performing operations such as metering, turning on or off a flash, selecting a color mode, and setting. A camera mode may be selected at a lower part of the interface, and may include aperture, night view, portrait, photo, video, pro, and more camera modes.

In a possible implementation, an operation for triggering zooming may also be performed above an interface of a terminal device. A user may select a zooming multiple, for example, any value from 1 time to 10 times by sliding a progress bar. After the user selects the zooming multiple, a current zooming multiple may be displayed in the operation icon.

It should be noted that FIG. 6 and FIG. 7 list only two manners for interface display. A person skilled in the art should understand that this embodiment of this application is not limited to such manners for the interface display, and the interface display may alternatively be implemented in a manner such as popping up a prompt box, or displaying a text on an interface.

Figure 8:
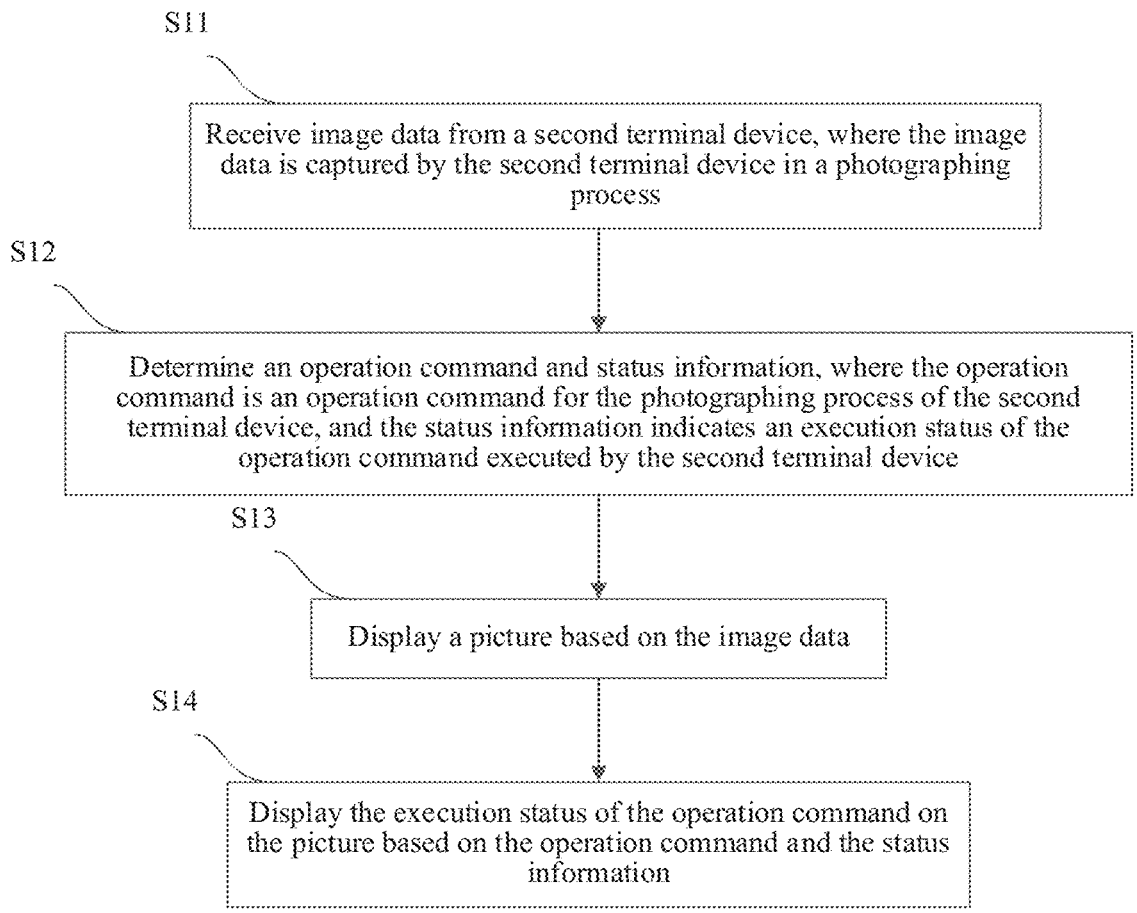
FIG. 8 is a flowchart of a camera control method according to an embodiment of this application.

FIG. 8 is a flowchart of a camera control method according to an embodiment of this application. The method may be applied to a first terminal device. As shown in FIG. 8, the method may include the following steps.

S11: Receive image data from a second terminal device, where the image data is captured by a second terminal device in a photographing process.

S12: Determine an operation command and status information, where the operation command is an operation command for the photographing process of the second terminal device, and the status information indicates an execution status of the operation command executed by the second terminal device.

S13: Display a picture based on the image data.

S14: Display the execution status of the operation command on the picture based on the operation command and the status information.

According to this embodiment of this application, the first terminal device receives the image data from the second terminal device, determines the operation command and the status information, displays the picture based on the image data, and displays the execution status of the operation command on the picture based on the operation command and the status information. In this way, the first terminal device can implement image synchronization, operation command synchronization and exchange, and status information synchronization and exchange with the second terminal device, so that the two ends can perform cooperative control on the camera, and a user can better understand current status information of a distributed camera, thereby improving control accuracy and user experience.

"In a photographing process" may indicate a stage when the second terminal device is performing photographing and before the photographing is completed. For example, the second terminal device starts a camera to enter a process of taking a photo or shooting a video. Before a photographing button or a button for ending video recording is tapped, the second terminal device is in the photographing process, and the second terminal device may display a photographing preview picture in the photographing process.

The image data may include image frame data. For example, when image processing such as focusing and zooming is not performed in the photographing process of the second terminal device, the image frame data may be each frame of image data captured by the camera in the photographing process. Each flame of image data may be of an RGB type, a YUV type, or a JPG format. This is not limited in this embodiment of this application. Alternatively, the image frame data may be each frame of image data obtained after processing such as zooming or focusing is performed. A picture displayed by the first terminal device after receiving the image frame data may be a photographing preview picture synchronized with the second terminal device. The image data may further include frame information (for example, a frame number of each frame of image) and basic image attribute information (for example, an image size and a resolution).

The user may trigger the operation command through an operation such as tapping or dragging. For example, an icon corresponding to the operation command may be displayed on the first terminal device and the second terminal device, and the user may trigger the operation command by tapping the icon or the like, to implement an operation on an image. The operation command triggered by the user and the execution status of the second terminal device after the second terminal device executes the command may be synchronized between the devices.

The operation command may include parameters such as a type, an area, and a mode. For example, an operation command of a focusing operation may correspond to a type of focusing, an area tapped by the user, and a mode of manual focusing. An operation command of a zooming operation may correspond to a type of zooming and a mode of X-fold magnification. An operation type of the operation command may include but is not limited to focusing, zooming, turning on or off a flash, adjusting exposure, using a filter, beautifying, skin smoothing, and the like. The operation command may be triggered by the first terminal device, or may be triggered by the second terminal device.

Different operation commands may have respective execution statuses. For example, an execution status of the focusing operation may include a focusing start status, a focusing in progress status, and a focusing completed status. An execution status of the zooming operation may include that zooming is completed to a specified multiple. An execution status of the operation of turning on or off a flash may include that the flash is turned on or the flash is turned off. The execution status may be set based on an operation feature and a display requirement. This is not limited in this embodiment of this application.

In a possible implementation, the execution status of the operation command may be displayed on an interface of the first terminal device, to indicate the focusing start status, the focusing in progress status, and the focusing completed status, to indicate that the zooming is completed to the specified multiple, or to indicate a status such as that the flash is turned on/off, so that the user knows an execution situation of the operation command on the second terminal device. A display manner may be displaying an icon, popping up a prompt box, displaying a text on an interface, or the like. For example, refer to FIG. 3 to FIG. 7. This is not limited in this embodiment of this application. The focusing operation is used as an example. A location of a manual focusing operation in the picture may be obtained based on the operation command, and an icon corresponding to the focusing start status, the focusing in progress status, and the focusing completed status are displayed at the location in the preview picture based on the status information. The zooming operation is used as an example. It may be obtained based on the operation command that the operation type is magnification and the magnification multiple is 3 times, and an indication of the current zooming multiple shown in FIG. 6 or FIG. 7 is displayed in the preview picture based on the status information that "the threefold magnification is completed".

Figure 9:
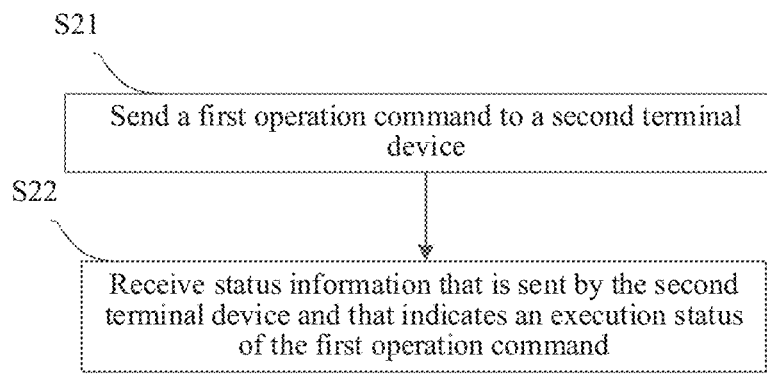
FIG. 9 is a flowchart of a camera control method according to an embodiment of this application.

FIG. 9 is a flowchart of a camera control method according to an embodiment of this application. As shown in FIG. 9, an operation command may include a first operation command generated in response to an operation for a first terminal device, and determining an operation command and status information may include the following steps.

S21: Send the first operation command to a second terminal device.

S22: Receive status information that is sent by the second terminal device and that indicates an execution status of the first operation command.

According to this embodiment of this application, the first operation command is sent to the second terminal device, and the status information that is sent by the second terminal device and that indicates the execution status of the first operation command is received. In this way, when the operation command is triggered by the first terminal device, the operation command and the status information are synchronized between cameras of the first terminal device and the second terminal device, so that the first terminal device can control the cameras, and a result and a status are shared. Therefore, camera control in a distributed camera scenario is more flexible and rapid, and control is more accurate.

For example, the first terminal device triggers a first operation command for performing a focusing operation. In a process in which the second terminal device executes the first operation command, the first terminal device may receive status information of focusing started, focusing in progress, and focusing completed (focusing success focusing failure). The first terminal device may synchronously display a photographing preview picture of the second terminal device, and display an execution status of the focusing operation by the second terminal device.

In a possible implementation, the operation command may include a second operation command generated in response to an operation for the second terminal device, and the determining an operation command and status information may include: receiving the second operation command and the status information that are sent by the second terminal device.

According to this embodiment of this application, the second operation command and the status information that are sent by the second terminal device are received, so that when the operation command is triggered by the second terminal device, the operation command and the status information can be synchronized with those of the first terminal device. In this way, a user of the first terminal device can learn a current status of the camera in real time, and on this basis, an operation on the camera can be implemented, thereby implementing multi-sided information exchange.

In a possible implementation, the determining an operation command and status information may include:

receiving status information sent by the second terminal device, where the status information indicates an execution status of a target operation command determined in a plurality of operation commands that is executed by the second terminal device, the plurality of operation commands are operation commands with a same operation type that are generated in response to operations for the second terminal device or one or more first terminal devices, and the target operation command is an operation command that corresponds to a largest frame number in the plurality of operation commands.

According to this embodiment of this application, when a plurality of operation commands triggered among devices conflict, a latest operation command can be responded to, and another party is allowed to cancel a command that is being executed, so that an intention of the user can be correctly selected, and a corresponding operation command can be selected, in this way, when a plurality of parties cooperate, a response is more flexible and rapid, and a multi-sided command can be mutually canceled and updated, thereby improving user experience.

A frame number of image data may be for determining a generation sequence of two images. A frame number of an image frame corresponding to an operation for generating an operation command may be used as a frame number corresponding to the operation command. For example, when the first terminal device or the second terminal device displays the photographing preview picture, the user taps the preview picture for focusing, and when the first terminal device or the second terminal device detects a tapping operation, a frame number of a displayed image frame may be used as a frame number corresponding to an operation command generated by the tapping operation. A larger frame number corresponding to an operation command indicates a later time at which an operation of the operation command occurs, and an operation command with a largest frame number may correspond to a latest operation. At a preset time interval, frame numbers corresponding to operation commands of a same type (for example, focusing) may be compared, and an operation command with a largest frame number in the current time interval of the type is selected as the target operation command, for example, within current 30 milliseconds, in operation commands of all focusing operations, an operation command with a largest frame number is selected, and is executed by the second terminal device. The predetermined time interval may be selected based on a requirement. For example, the predetermined time interval is determined based on a current quantity of frames output per second of a camera system of the second terminal device. For example, in a case of 30 frames per second, the predetermined time interval may be 100/3 milliseconds.

In an example, a plurality of first terminal devices may generate operation commands of a same type (For example, a plurality of users simultaneously trigger zooming operation commands on different first terminal devices). These operation commands are all sent to the second terminal device. The second terminal device may determine frame numbers corresponding to the operation commands sent by the first terminal devices, and select the target operation command with the largest frame number for execution.

In still another example, one or more first terminal devices and the second terminal device itself may generate operation commands of a same type, and the second terminal device may determine an operation command sent by each first terminal device and a frame number corresponding to the operation command generated by the second terminal device. The target operation command with the largest frame number is selected for execution.

The second terminal device may send the status information indicating the execution status of the target operation command to all first terminal devices, which may include a first terminal device that triggers the operation command or does not trigger the operation command, that communicate with the second terminal device. If the second terminal device or a first terminal device triggers an operation command, and the operation command is not of a same type with a largest frame number, the operation command is not executed, which is equivalent to being canceled.

For example, the second terminal device detects two zooming operation commands within 30 milliseconds, one is a command triggered by the second terminal device to man an image whose frame number is 30 by three times, and the other is a command triggered by the first terminal device to magnify an image whose frame number is 25 by two times. In this case, the target operation command is a command corresponding to a larger frame number, namely, the command of threefold magnification. For the first terminal device, before status information indicating that the threefold magnification is completed is received, that the operation command of twofold magnification is completed may be displayed, After the status information that the threefold magnification is completed is received, the status information that the threefold magnification is completed may be displayed.

Figure 10:
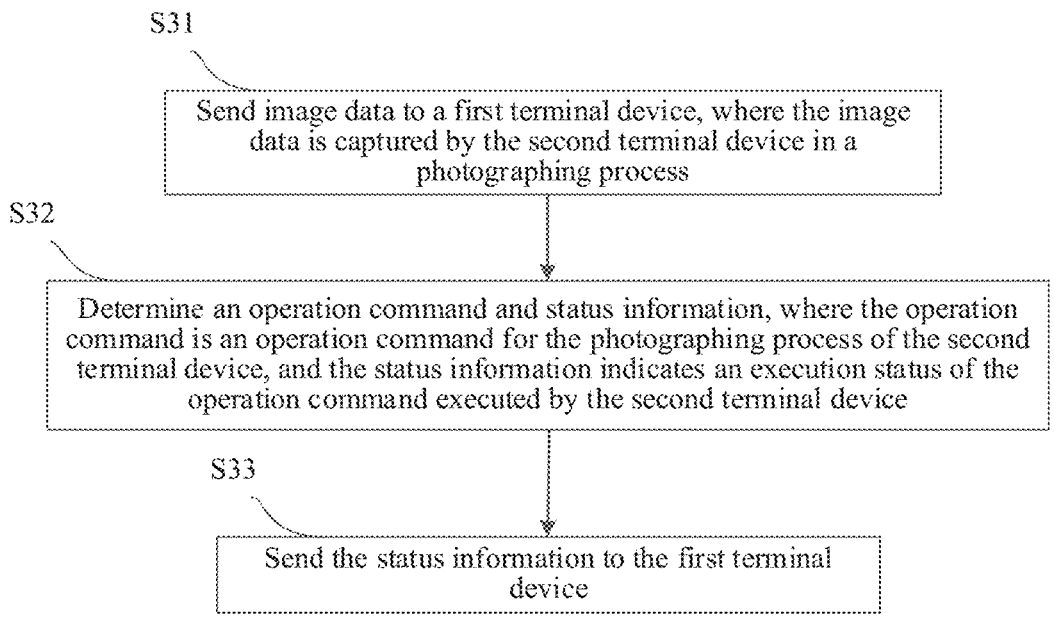
FIG. 10 is a flowchart of a camera control method according to an embodiment of this application.

FIG. 10 is a flowchart of a camera control method according to an embodiment of this application. The method may be applied to a second terminal device. As shown in FIG. 10, the method may include the Mowing steps.

S31: Send image data to a first terminal device, where the image data is captured by the second terminal device in a photographing process.

S32: Determine an operation command and status information, where the operation command is an operation command for the photographing process of the second terminal device, and the status information indicates an execution status of the operation command executed by the second terminal device.

S33: Send the status information to the first terminal device.

According to this embodiment of this application, the second terminal device sends the image data to the first terminal device, determines the operation command and the status information, and sends the status information to the first terminal device. In this way, an image, an operation command, and status information of a multi-sided device can be synchronized and exchanged, so that a peer end can also perform cooperative control on a camera, and distributed camera control can be implemented.

Figure 11:
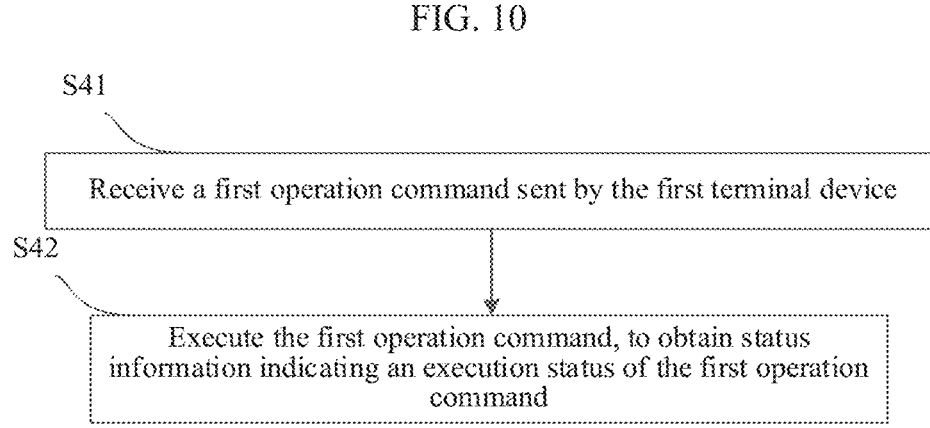
FIG. 11 is a flowchart of a camera control method according to an embodiment of this application.

FIG. 11 is a flowchart of a camera control method according to an embodiment of this application. As shown in FIG. 11, an operation command may include a first operation command generated in response to an operation for a first terminal device, and determining an operation command and status information may include the following steps.

S41: Receive the first operation command sent by the first terminal device.

S42: Execute the first operation command, to obtain status information indicating an execution status of the first operation command.

According to this embodiment of this application, the first operation command sent by the first terminal device is received, and the first operation command is executed, to obtain the status information indicating the execution status of the first operation command. In this way, when the operation command is triggered by the first terminal device, the operation command can be synchronized and the command can be executed, thereby implementing controlling on a camera performed by a multi-sided device. By performing multi-sided synchronization on the execution status after execution, a user of the multi-sided device can intuitively learn a current status of the camera, thereby facilitating a subsequent operation performed by the user, making control more accurate, and improving user experience.

Figure 12:
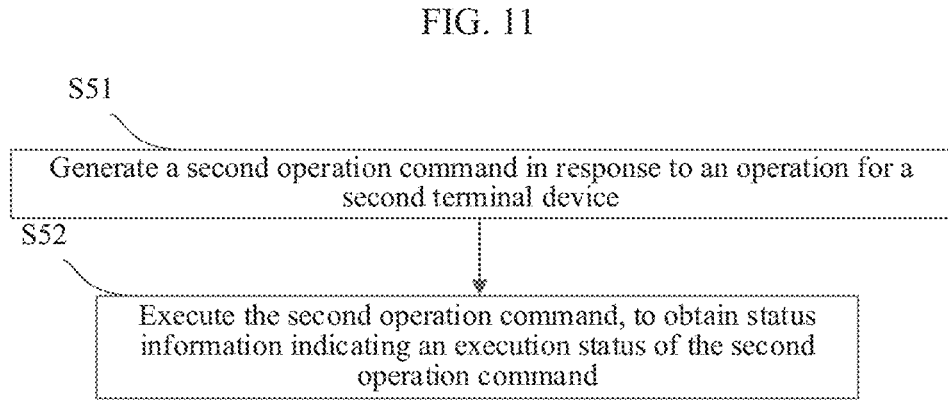
FIG. 12 is a flowchart of a camera control method according to an embodiment of this application.

FIG. 12 is a flowchart of a camera control method according to an embodiment of this application. As shown in FIG. 12, determining an operation command and status information may include the following steps.

S51: Generate a second operation command in response to an operation for a second terminal device.

S52: Execute the second operation command, to obtain status information indicating an execution status of the second operation command.

According to this embodiment of this application, the second operation command is generated in response to the operation for the second terminal device, and the second operation command is executed to obtain the status information indicating the execution status of the second operation command. In this way, when the operation command is triggered by the second terminal device, the operation command is executed to obtain corresponding status information, to synchronize the status information to a multi-sided device, so that the multi-sided device can perform cooperative control on the camera.

FIG. 13 is a flowchart of a camera control method according to an embodiment of this application. As shown in FIG. 13, determining an operation command and status information may include the following steps.

S61: Determine a target operation command from a plurality of operation commands, where the plurality of operation commands are operation commands with a same operation type that are generated in response to operations for the second terminal device or one or more first terminal devices, and the target operation command is an operation command that corresponds to a largest frame number in the plurality of operation commands.

S62: Execute the target operation command, to obtain status information indicating an execution status of the target operation command.

According to this embodiment of this application, when a plurality of triggered operation commands conflict, the second terminal device may execute a latest operation command by using a concurrent response policy, and a peer side is allowed to cancel a command that is being executed, so that an intention of the user can be correctly selected, and a corresponding operation command can be selected. In this way, when a plurality of parties cooperate, a response is more flexible and rapid, and a multi-sided command can be mutually canceled and updated, thereby improving user experience.

For example descriptions of the second terminal device, refer to the foregoing descriptions. Details are not described herein again.

FIG. 14 is a diagram of a structure of a camera control apparatus according to an embodiment of this application. The apparatus may be used in a first terminal device. As shown in FIG. 14, the apparatus may include:

an image data receiving module 1401, configured to receive image data from a second terminal device, where the image data is captured by the second terminal device in a photographing process;

a first information determining module 1402, configured to determine an operation command and status information, where the operation command is an operation command for the photographing process of the second terminal device, and the status information indicates an execution status of the operation command executed by the second terminal device;

a picture display module 1403, configured to display a picture based on the image data; and an execution status display module 1404, configured to display the execution status of the operation command on the picture based on the operation command and the status information.

According to this embodiment of this application, the first terminal device receives the image data from the second terminal device, determines the operation command and the status information, displays the picture based on the image data, and displays the execution status of the operation command on the picture based on the operation command and the status information. In this way, the first terminal device can implement image synchronization, operation command synchronization and exchange_ and status information synchronization and exchange with the second terminal device, so that the two ends can perform cooperative control on the camera, and a user can better understand current status information of a distributed camera, thereby improving control accuracy and user experience.

In a possible implementation of the camera control apparatus, the operation command includes a first operation command generated in response to an operation for the first terminal device, and the first information determining module includes: a first operation command sending submodule, configured to send the first operation command to the second terminal device; and a first information receiving submodule, configured to receive status information that is sent by the second terminal device and that indicates an execution status of the first operation command.

According to this embodiment of this application, the first operation command is sent to the second terminal device, and the status information that is sent by the second terminal device and that indicates the execution status of the first operation command is received. In this way, when the operation command is triggered by the first terminal device, the operation command and the status information are synchronized between cameras of the first terminal device and the second terminal device, so that the first terminal device can control the cameras, and a result and a status are shared. Therefore, camera control in a distributed camera scenario is more flexible and rapid, and control is more accurate.

In a possible implementation of the camera control apparatus, the operation command includes a second operation command generated in response to an operation for the second terminal device, and the first information determining module includes a second information receiving submodule, configured to receive the second operation command and the status information that are sent by the second terminal device.

According to this embodiment of this application, the second operation command and the status information that are sent by the second terminal device are received, so that when the operation command is triggered by the second terminal device, the operation command and the status information can be synchronized with those of the first terminal device. In this way, a user of the first terminal device can learn a current status of the camera in real time, and on this basis, an operation on the camera can be implemented, thereby implementing multi-sided information exchange.

In a possible implementation of the camera control apparatus, the first information determining module includes: a status information receiving submodule, configured to receive status information sent by the second terminal device, where the status information indicates an execution status of a target operation command determined in a plurality of operation commands that is executed by the second terminal device, the plurality of operation commands are operation commands with a same operation type that are generated in response to operations for the second terminal device or one or more first terminal devices, and the target operation command is an operation command that corresponds to a largest frame number in the plurality of operation commands.

According to this embodiment of this application, when a plurality of operation commands triggered among devices conflict, a latest operation command can be responded to, and another party is allowed to cancel a command that is being executed, so that an intention of the user can be correctly selected, and a corresponding operation command can be selected. In this way, when a plurality of parties cooperate, a response is more flexible and rapid, and a multi-sided command can be mutually canceled and updated, thereby improving user experience.

In a possible implementation of the camera control apparatus, an operation type of the operation command includes one or more of focusing, zooming, turning on or off a flash, adjusting exposure, using a filter, beautifying, and skin smoothing.

According to this embodiment of this application, operations that can be performed on an image on the first terminal device can be enriched, and a distributed camera control scenario can be implemented by using interface displays of the first terminal device and the second terminal device, so that user experience is better.

FIG. 15 is a diagram of a structure of a camera control apparatus according to an embodiment of this application. The apparatus may be used in a second terminal device. As shown in FIG. 15, the apparatus may include:
- an image data sending module 1501, configured to send image data to a first terminal device, where the image data is captured by the second terminal device in a photographing process;
- a second information determining module 1502, configured to determine an operation command and status information, where the operation command is an operation command for the photographing process of the second terminal device, and the status information indicates an execution status of the operation command executed by the second terminal device; and
- a status information sending module 1503, configured to send the status information to the first terminal device.

According to this embodiment of this application, the second terminal device sends the image data to the first terminal device, determines the operation command and the status information, and sends the status information to the first terminal device. In this way, an image, an operation command, and status information of a multi-sided device can be synchronized and exchanged, so that a peer end can also perform cooperative control on a camera, and distributed camera control can be implemented.

In a possible implementation of the camera control apparatus, the operation command includes a first operation command generated in response to an operation for the first terminal device; and the second information determining module includes: an operation command receiving submodule, configured to receive the first operation command sent by the first terminal device; and a first operation command execution submodule, configured to execute the first operation command, to obtain status information indicating an execution status of the first operation command.

According to this embodiment of this application, the first operation command sent by the first terminal device is received, and the first operation command is executed, to obtain the status information indicating the execution status of the first operation command. In this way, when the operation command is triggered by the first terminal device, the operation command can be synchronized and the command can be executed, thereby implementing controlling on a camera performed by the multi-sided device. By performing multi-sided synchronization on the execution status after execution, a user of the multi-sided device can intuitively learn a current status of the camera, thereby facilitating a subsequent operation performed by the user, making control more accurate, and improving user experience.

In a possible implementation of the camera control apparatus, the second information determining module includes: an operation command generation submodule, configured to generate a second operation command in response to an operation for the second terminal device; and a second operation command execution submodule, configured to execute the second operation command, to obtain status information indicating an execution status of the second operation command.

According to this embodiment of this application, the second operation command is generated in response to the operation for the second terminal device, and the second operation command is executed to obtain the status information indicating the execution status of the second operation command. In this way, when the operation command is triggered by the second terminal device, the operation command is executed to obtain corresponding status information, to synchronize the status information to the multi-sided device, so that the multi-sided device can perform cooperative control on the camera.

In a possible implementation of the camera control apparatus, the second information determining module includes: a target operation command determining submodule, configured to determine a target operation command from a plurality of operation commands, where the plurality of operation commands are operation commands with a same operation type that are generated in response to operations for the second terminal device or one or more first terminal devices, and the target operation command is an operation command that corresponds to a largest frame number in the plurality of operation commands; and a target operation command execution submodule, configured to execute the target operation command, to obtain status information indicating an execution status of the target operation command.

According to this embodiment of this application, when a plurality of triggered operation commands conflict, the second terminal device may execute a latest operation command by using a concurrent response policy, and a peer side is allowed to cancel a command that is being executed, so that an intention of the user can be correctly selected, and a corresponding operation command can be selected. In this way, when a plurality of parties cooperate, a response is more flexible and rapid, and a multi-sided command can be mutually canceled and updated, thereby improving user experience.

In a possible implementation manner of the camera control apparatus, in a fourth possible implementation manner of the camera control method, an operation type of the operation command includes one or more of focusing, zooming, turning on or off a flash, adjusting exposure, using a filter, beautifying, and skin smoothing.

According to this embodiment of this application, operations that can be performed on an image on the second terminal device can be enriched, and a distributed camera control scenario can be implemented by using interface displays of the first terminal device and the second terminal device, so that user experience is better.

Figure 16:
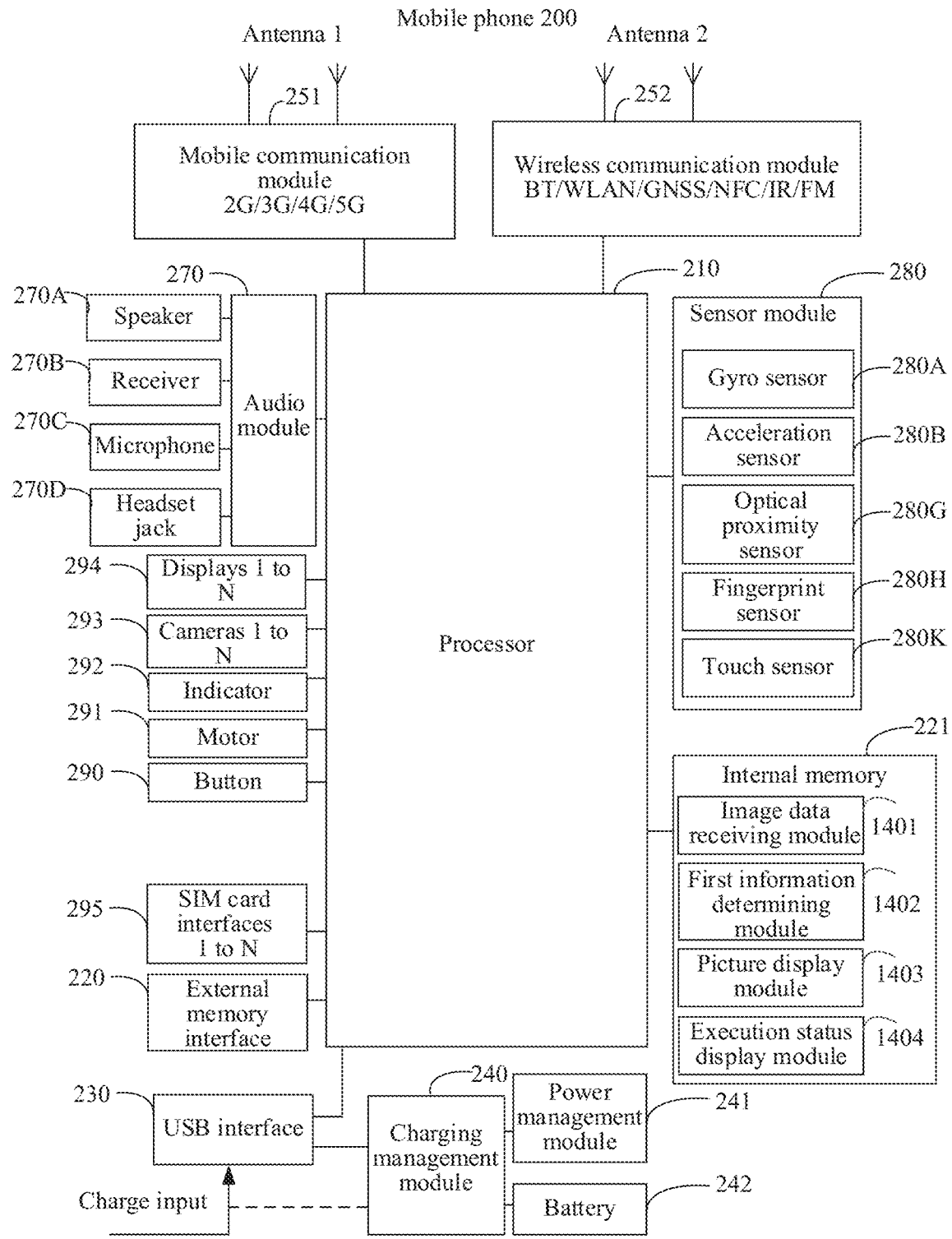
FIG. 16 is a schematic diagram of a structure of a terminal device according to an embodiment of this application.

FIG. 16 is a schematic diagram of a structure of a terminal device according to an embodiment of this application. Taking an example in which the terminal device is a mobile phone, FIG. 16 is a schematic diagram of a structure of a mobile phone 200.

The mobile phone 200 may include a processor 210, an external memory interface 220, an internal memory 221, a USB interface 230, a charging management module 240, a power management module 241, a battery 242, an antenna 1, an antenna 2, a mobile communication module 251, a wireless communication module 252, an audio module 270, a speaker 270A, a receiver 270B, a microphone 270C, a headset jack 270D, a sensor module 280, a button 290, a motor 291, an indicator 292, a camera 293, a display 294, an SIM card interface 295, and the like. The sensor module 280 may include a gyro sensor 280A, an acceleration sensor 280B, an optical proximity sensor 280G, a fingerprint sensor 280H, and a touch sensor 280K (certainly, the mobile phone 200 may further include another sensor, for example, a temperature sensor, a pressure sensor, a distance sensor, a magnetic sensor, an ambient light sensor, a barometric pressure sensor, or a bone conduction sensor, which is not shown in the figure).

It may be understood that the structure shown in this embodiment of this application does not constitute a specific limitation on the mobile phone 200. In some other embodiments of this application, the mobile phone 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors. The controller may be a nerve center and a command center of the mobile phone 200. The controller may generate an operation control signal based on an instruction operation code and a time sequence signal, and complete control of instruction fetching and instruction execution.

A memory may be further disposed in the processor 210, and is configured to store instructions and data. In some embodiments, the memory in the processor 210 is a cache memory. The memory may store instructions or data that has just been used or cyclically used by the processor 210. If the processor 210 needs to use the instructions or the data again, the instructions or the data may be directly invoked from the memory. This avoids repeated access, and reduces a waiting time of the processor 210, thereby improving system efficiency.

The processor 210 may run a camera control method provided in this embodiment of this application, to facilitate supporting camera control performed by a plurality of first terminal devices on a same second terminal device, and camera sharing control is truly implemented. For a command on a device, devices may perceive each other, a command execution result may be shared among the devices, and concurrent triggering of commands by the devices is supported. Through a cooperation mechanism, an intention of the user can be correctly understood. Concurrent commands among the devices can be mutually canceled and updated. A response speed is quick, being more flexible and quicker, thereby bringing more convenient user experience to the user. The processor 210 may include different components. For example, when a CPU and a GPU are integrated, the CPU and the GPU may cooperate to perform the camera control method provided in this embodiment of this application. For example, in the camera control method, some algorithms are executed by the CPU, and the other algorithms are executed by the GPU, to obtain fast processing efficiency.

The display 294 is configured to display an image, a video, or the like. The display 294 includes a display panel. The display panel may be a liquid crystal display (liquid crystal display, LCD), an organic light-emitting diode (organic light-emitting diode. OLED), an active-matrix organic light emitting diode (active-matrix organic light emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the mobile phone 200 may include 1 or N displays 294, where N is a positive integer greater than 1. The display 294 may be configured to display information input by the user or information provided to the user and various graphical user interfaces graphical user interface, GUI). For example, the display 294 may display a photo, a video, a web page, a file, or the like. For another example, the display 294 may display a graphical user interface. The graphical user interface includes a status bar, a navigation bar that can be hidden, a time and weather widget (widget), and an application icon, for example, a browser icon. The status bar includes a carrier name (for example, China Mobile), a mobile network (for example, 4G), a time, and a remaining quantity of electricity. The navigation bar includes a back (back) key icon, a home (home) key icon, and a forwarding key icon. In addition, it may be understood that, in some embodiments, the status bar may further include a Bluetooth icon, a Wi-Fi icon, an external device icon, and the like. It may be further understood that, in some other embodiments, the graphical user interface may further include a Dock bar, and the Dock bar may include a common application icon or the like. After detecting a touch event of a finger (or a stylus or the like) of the user on an application icon, the processor 210 opens, in response to the touch event, a user interface of an application corresponding to the application icon, and displays the user interface of the application on the display 294.

In this embodiment of this application, the display 294 may be an integrated flexible display, or may be a spliced display formed by two rigid screens and one flexible screen located between the two rigid screens.

After the processor 210 runs the camera control method provided in this embodiment of this application, the terminal device may establish a connection to another terminal device through the antenna 1, the antenna 2, or the USB interface, and transmit data and control the display 294 to display a corresponding graphical user interface according to the camera control method provided in this embodiment of this application.

The camera 293 (a front-facing camera or a rear-facing camera, or a camera which may be used as either the front-facing camera or the rear-facing camera) is configured to capture a static image or a video. Generally, the camera 293 may include photosensitive elements such as a lens group and an image sensor. The lens group includes a plurality of lenses (convex lenses or concave lenses), configured to collect an optical signal reflected by a to-be-photographed object, and transfer the collected optical signal to the image sensor. The image sensor generates an original image of the to-be-photographed object based on the optical signal.

The internal memory 221 may be configured to store computer-executable program code, and the executable program code includes instructions. The processor 210 runs the instructions stored in the internal memory 221, to perform various functional applications and data processing of the mobile phone 200. The internal memory 221 may include a program storage area and a data storage area. The program storage area may store an operating system, code of an application (such as a camera application or a WeChat application), and the like. The data storage area may store data (such as an image or a video captured by a camera application) and the like created when the mobile phone 200 is used.

The internal memory 221 may further store one or more computer programs 1310 corresponding to the camera control method provided in this embodiment of this application. The one or more computer programs 1304 are stored in the foregoing memory 221 and are configured to be executed by the one or more processors 210. The one or more computer programs 1310 include instructions, and the foregoing instructions may be for performing steps in corresponding embodiments in FIG. 2 and FIG. 8 to FIG. 13, The computer program 1310 may include an image data receiving module 1401, configured to receive image data from a second terminal device, where the image data is captured by the second terminal device in a photographing process; a first information determining module 1402, configured to determine an operation command and status information, where the operation command is an operation command for the photographing process of the second terminal device, and the status information indicates an execution status of the operation command executed by the second terminal device; a picture display module 1403, configured to display a picture based on the image data; and; and an execution status display module 1404, configured to display the execution status of the operation command on the picture based on the operation command and the status information. The computer program 1310 may further include an image data sending module 1501, configured to send image data to a first terminal device, where the image data is captured by a second terminal device in a photographing process; a second information determining module 1502, configured to determine an operation command and status information, where the operation command is an operation command for the photographing process of the second terminal device, and the status information indicates an execution status of the operation command executed by the second terminal device; and a status information sending module 1503, configured to send the status information to the first terminal device (not shown).

In addition, the internal memory 221 may include a high-speed random access memory, or may further include a non-volatile memory such as at least one magnetic disk memory, a flash memory, or a universal flash storage (universal flash storage, UFS).

Certainly, code of the camera control method provided in this embodiment of this application may be further stored in an external memory. In this case, the processor 210 may run the code of the camera control method stored in the external memory through the external memory interface 220.

A function of the sensor module 280 is described below

The gyro sensor 280A may be configured to determine a motion posture of the mobile phone 200. In some embodiments, angular velocities of the mobile phone 200 around three axes (namely, x, y, and z axes) may be determined by using the gyro sensor 280A. That is, the gyro sensor 280A may be configured to detect a current motion status, such as shaking or being static, of the mobile phone 200.

When the display in this embodiment of this application is a foldable screen, the gyro sensor 280A may be configured to detect a folding or unfolding operation performed on the display 294. The gyro sensor 280A may report the detected folding operation or unfolding operation as an event to the processor 210, to determine a folding status or unfolding status of the display 294.

The acceleration sensor 280B may detect magnitudes of accelerations of the mobile phone 200 in all directions (generally the three axes). That is, the gyro sensor 280A may be configured to detect a current motion status, such as shaking or being static, of the mobile phone 200. When the display in this embodiment of this application is a foldable screen, the acceleration sensor 280B may be configured to detect a folding or unfolding operation performed on the display 294. The acceleration sensor 280B may report the detected folding operation or unfolding operation as an event to the processor 210, to determine a folding status or unfolding status of the display 294.

The optical proximity sensor 280G may include, for example, a light emitting diode (LED) and an optical detector, for example, a photodiode. The light emitting diode may be an infrared light emitting diode. The mobile phone emits infrared light through the light emitting diode. The mobile phone detects infrared reflected light from a nearby object by using the photodiode. When sufficient reflected light is detected, it may be determined that there is an object near the mobile phone. When insufficient reflected light is detected, the mobile phone may determine that there is no object near the mobile phone. When the display in this embodiment of this application is a foldable screen, the optical proximity sensor 280G may be disposed on a first screen of the foldable display 294. The optical proximity sensor 280G may detect a folding angle or an unfolding angle between the first screen and a second screen based on an optical path difference of an infrared signal.

The gyro sensor 280A (or the acceleration sensor 280B) may send detected motion status information (for example, an angular velocity) to the processor 210. The processor 210 determines whether a current status is a handheld status or a stand status (for example, when the angular velocity is not 0, it indicates that the mobile phone 200 is in the handheld status) based on the motion status information.

The fingerprint sensor 280H is configured to collect a fingerprint. The mobile phone 200 may implement fingerprint-based unlocking, application lock access, fingerprint-based photographing, fingerprint-based incoming call answering, and the like by using a feature of the collected fingerprint.

The touch sensor 280K is also referred to as a "touch panel". The touch sensor 280K may be disposed on the display 294. The touch sensor 280K and the display 294 form a touch screen, which is also referred to as a "touchscreen". The touch sensor 280K is configured to detect a touch operation performed on or near the touch sensor. The touch sensor may transfer the detected touch operation to the application processor, to determine a touch event type. A visual output related to the touch operation may be provided through the display 294. In some other embodiments, the touch sensor 280K may alternatively be disposed on a surface of the mobile phone 200, and a location of the touch sensor is different from that of the display 294.

For example, the display 294 of the mobile phone 200 displays a main interface, and the main interface includes icons of a plurality of applications (such as a camera application and a WeChat application). The user taps the icon of the camera application in the main interface through the touch sensor 280K, to trigger the processor 210 to start the camera application and start the camera 293. The display 294 displays an interface, for example, a viewfinder interface, of the camera application.

A wireless communication function of the mobile phone 200 may be implemented by using the antenna 1, the antenna 2, the mobile communication module 251, the wireless communication module 252, the modem processor, the baseband processor, and the like.

The antenna 1 and the antenna 2 are configured to transmit or receive an electromagnetic wave signal. Each antenna in the mobile phone 200 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 251 may provide a solution to wireless communication including 2G/3G/4G/5G or the like applied to the mobile phone 200. The mobile communication module 251 may include at least one filter, a switch, a power amplifier, a low noise amplifier (low noise amplifier, LNA), and the like. The mobile communication module 251 may receive an electromagnetic wave through the antenna 1, perform processing such as filtering and amplification on the received electromagnetic wave, and transmit the processed electromagnetic wave to the modem processor for demodulation. The mobile communication module 251 may further amplify a signal modulated by the modem processor, and convert the signal into an electromagnetic wave for radiation through the antenna 1. In some embodiments, at least some functional modules of the mobile communication module 251 may be disposed in the processor 210. In some embodiments, at least some functional modules of the mobile communication module 251 and at least some modules of the processor 210 may be disposed in a same component. In this embodiment of this application, the mobile communication module 251 may be further configured to exchange information, for example, send an operation command, send status information, and receive image data, with another terminal device.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transferred to the application processor. The application processor outputs a sound signal through an audio device (which is not limited to the speaker 270A, the receiver 270B, or the like), or displays an image or a video through the display 294. In some embodiments, the modem processor may be an independent component. In some other embodiments, the modem processor may be independent of the processor 210, and the modem processor and the mobile communication module 251 or another functional module may be disposed in a same component.

The wireless communication module 252 may provide a solution to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology, or the like applied to the mobile phone 200. The wireless communication module 252 may be one or more components that integrate at least one communication processing module. The wireless communication module 252 receives an electromagnetic wave through the antenna 2, performs frequency modulation and filtering processing on an electromagnetic wave signal, and sends a processed signal to the processor 210. The wireless communication module 252 may further receive a to-be-sent signal from the processor 210, perform frequency modulation and amplification on the signal, and convert the signal into an electromagnetic wave for radiation through the antenna 2. In this embodiment of this application, the wireless communication module 252 is configured to transmit data to another terminal device under control of the processor 210. For example, when the processor 210 runs the camera control method provided in this embodiment of this application, the processor may control the wireless communication module 252 to send an operation command and status information to the another terminal device, and may also receive image data to implement camera control, provide intuitive visual feedback for the user, avoid a wrong operation and a repeated operation of the user, and improve operation efficiency.

The mobile phone 200 may implement an audio function, for example, music playback or recording, by using the audio module 270, the speaker 270A, the receiver 270B, the microphone 270C, the headset jack 270D, the application processor, and the like. The mobile phone 200 may receive an input of the button 290, and generate a key signal input related to user setting and function control of the mobile phone 200. The mobile phone 200 may generate a vibration prompt (for example, an incoming call vibration prompt) by using the motor 291. The indicator 292 in the mobile phone 200 may be an indicator light, and may be configured to indicate a charging status and a change of a quantity of electricity, or may be configured to indicate a message, a missed call, a notification, or the like. The SIM card interface 295 in the mobile phone 200 is configured to be connected to an SIM card. The SIM card may be inserted into the SIM card interface 295 or plugged from the SIM card interface 295 to come into contact with or be separated from the mobile phone 200.

It should be understood that, in actual application, the mobile phone 200 may include more or fewer components than those shown in FIG. 16. This is not limited in this embodiment of this application. The mobile phone 200 shown in the figure is merely an example, and the mobile phone 200 may have more or fewer components than those shown in the figure, may combine two or more components, or may have a different component configuration. The components shown in the figure may be implemented in hardware, software, or a combination of hardware and software that includes one or more signal processing and; or application specific integrated circuits.

A software system of the terminal device may use a layered architecture, an event-driven architecture, a microkernel architecture, a microservice architecture, or a cloud architecture. In embodiments of this application, the software structure of the terminal device is exemplarily described by using an Android system with a layered architecture as an example.

Figure 17:
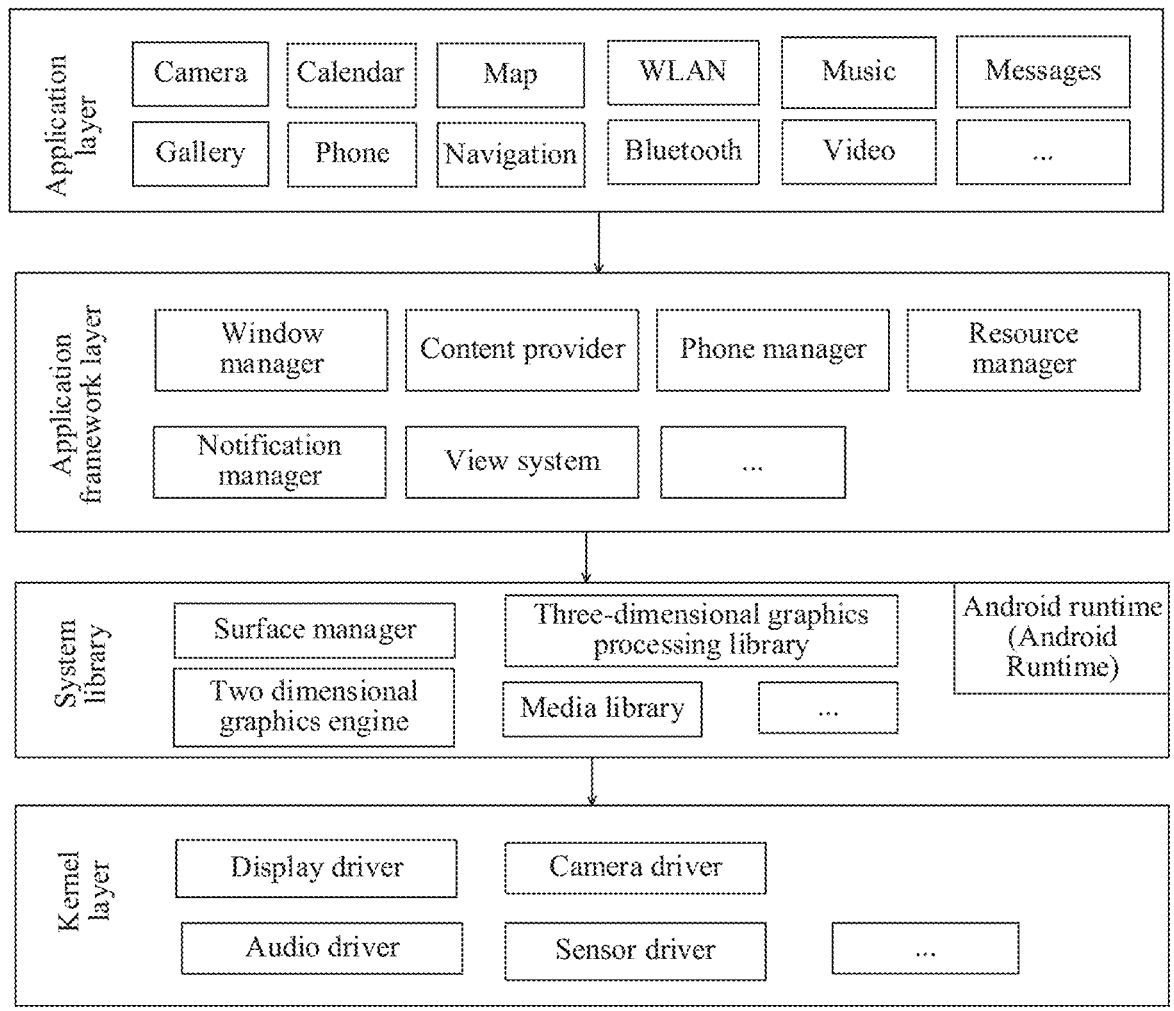
FIG. 17 is a block diagram of a software structure of a terminal device according to an embodiment of this application.

FIG. 17 is a block diagram of a software structure of a terminal device according to an embodiment of this application.

In the layered architecture, software is divided into several layers, and each layer has a clear role and task. Layers communicate with each other through a software interface. In some embodiments, the Android system is divided into four layers: an application layer, an application framework layer, an Android runtime (Android runtime), a system library, and a kernel layer from top to bottom.

The application layer may include a series of application packages.

As shown in FIG. 17, the application packages may include applications such as Phone, Camera, Gallery, Calendar, Phone, Map, Navigation, WLAN, Bluetooth, Music, Video, and Messages.

The application framework layer provides an application programming interface (application programming interface, API) and a programming framework for the applications at the application layer. The application framework layer includes some predefined functions.

As shown in FIG. 17, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like. The window manager may be further configured to detect whether the camera control operation, for example, the focusing operation, the zooming operation, or the operation of turning on or off a flash, in embodiments of this application exists.

The content provider is configured to store and obtain data, and enable the data to be accessible to an application. The data may include a video, an image, audio, calls that are made and answered, browsing history and bookmarks, an address book, and the like.

The view system includes visual controls such as a control for displaying text and a control for displaying an image. The view system may be configured to construct an application. A display interface may include one or more views. For example, a display interface including an SMS notification icon may include a view for displaying text and a view for displaying an image.

The phone manager is configured to provide a communication function, for example, management of a call status (including answering or declining), of the terminal device.

The resource manager provides various resources such as a localized character string, an icon, an image, a layout file, and a video file for an application.

The notification manager enables an application to display notification information in the status bar, which may be a message configured to convey a notification type, and may automatically disappear after a short pause without requiring user interaction. For example, the notification manager is configured to notify download completion, give a message notification, and the like. The notification manager may alternatively be a notification that appears on a top status bar of the system in a form of a graph or scroll bar text, for example, a notification of an application running on a background, or may be a notification that appears on a screen in a form of a dialog window. For example, text information is prompted on the status bar, a prompt tone is played, the terminal device vibrates, or an indicator light blinks.

The Android runtime includes a kernel library and a virtual machine. The Android runtime is responsible for scheduling and managing the Android system.

The kernel library includes two parts: one part is the functional function that needs to be invoked in Java language, and the other part is a kernel library of Android.

The application layer and the application framework layer run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of functional modules, tbr example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An embodiment of this application provides a camera control apparatus, including a processor and a memory configured to store processor-executable instructions, where the processor is configured to implement the foregoing method when executing the instructions.

An embodiment of this application provides a non-volatile computer readable storage medium, storing computer program instructions, and when the computer program instructions are executed by a processor, the foregoing method is implemented.

An embodiment of this application provides a computer program product, including computer readable code or a non-volatile computer readable storage medium that includes the computer readable code. When the computer readable code runs in a processor of an electronic device, the processor in the electronic device performs the foregoing method.

For exemplary descriptions of the foregoing embodiments, reference may be made to the method embodiment part, and details are not described herein again.

The computer readable storage medium may be a tangible device that may hold and store instructions used by an instruction execution device. The computer readable storage medium may be, for example, but is not limited to, an electrical storage device, a magnetic storage device, an optical storage device, an electromagnetic storage device, a semiconductor storage device, or any appropriate combination of the above. More specific examples (a non-exhaustive list) of the computer readable storage medium include: a portable computer diskette, a hard disk, a random access memory (Random Access Memory, RAM), a read only memory (Read Only Memory, ROM), an electrically programmable read-only-memory (Electrically Programmable Read-Only-Memory, EPROM or flash memory), a static random-access memory (Static Random-Access Memory, SRAM), a compact disc read-only memory (Compact Disc Read-Only Memory, CD-ROM), a digital video disc (Digital Video Disc, DVD), a memory stick, a floppy disk, a mechanically encoded device, such as a punched card or protrusion in a groove in which instructions are stored, and any appropriate combination of the above.

The computer readable program instructions or code described herein may be downloaded from the computer readable storage medium to various computing/processing devices, or downloaded to an external computer or external storage device via a network, for example, the Internet, a local area network, a wide area network, and/or a wireless network. The network may include copper transmission cables, fiber transmission, wireless transmission, routers, firewalls, switches, gateway computers, and/or edge servers. A network adapter card or a network interface in each computing/processing device receives the computer readable program instructions from the network, and forwards the computer readable program instructions to be stored in the computer readable storage medium in each computing/processing device.

Computer program instructions for performing an operation in this application may be assembly instructions, instruction set architecture (Instruction Set Architecture, ISA) instructions, machine instructions, machine-related instructions, microcode, firmware instructions, status setting data, or source code or object code written in any combination of one or more programming languages. The programming languages include object-oriented programming languages such as Smalltalk and C++, and conventional procedural programming languages such as "C" language or similar programming languages. The computer readable program instructions may be executed entirely on a computer of a user, partially on the computer of the user, as a stand-alone software package, partially on the computer of the user and partially on a remote computer, or entirely on the remote computer or a server. In a situation involving the remote computer, the remote computer may be connected to the computer of the user through any type of network, including a local area network (Local Area Network, LAN) or a wide area network (Wide Area Network, WAN), or, may be connected to an external computer (for example, through the Internet by using an Internet service provider). In some embodiments, an electronic circuit, such as a programmable logic circuit, a field-programmable gate array (Field-Programmable Gate Array, FPGA), or a programmable logic array (Programmable Logic Array, PLA), is customized by using status information of the computer readable program instructions. The electronic circuit may execute a computer readable program instructions, thereby implementing various aspects of this application.

Aspects of this application are described herein with reference to flowcharts and/or block diagrams of the method, the apparatus (system), and the computer program product according to the embodiments of this application. It should be understood that each block in the flowcharts and/or the block diagrams and a combination of blocks in the flowcharts and/or the block diagrams can be implemented by the computer readable program instructions.

These computer readable program instructions may be provided to a processor of a general purpose computer, a special purpose computer, or another programmable data processing apparatus to produce a machine, so that when the instructions are executed by a processor of a computer or another programmable data processing apparatus, an apparatus for implementing functions/actions specified in one or more blocks of the flowcharts and/or block diagrams are produced. These computer readable program instructions may also be stored in the computer readable storage medium. These instructions enable a computer, a programmable data processing apparatus, and/or another device to operate in a particular manner, so that the computer readable medium storing the instructions includes a product, including instructions for implementing various aspects of functions/actions specified in one or more blocks of the flowcharts and/or block diagrams.

The computer readable program instructions may also be loaded onto a computer, another programmable data processing apparatus, or another device, so that a series of operational steps are performed on the computer, the another programmable data processing apparatus, or the another device to produce a computer-implemented process. This enables instructions executed on the computer, the another programmable data processing apparatus, or the another device to implement functions/actions specified in one or more blocks of the flowcharts and/or block diagrams.

The flowcharts and block diagrams in the accompanying drawings show system architectures, functions, and operations that may be implemented by apparatuses, systems, methods, and computer program products according to a plurality of embodiments of this application. In this regard, each block in the flowchart or block diagram may represent a module, a program segment, or a part of instructions, where the module, the program segment, or the part of instructions includes one or more executable instructions for implementing a specified logical function. In softie alternative implementations, functions marked in the blocks may occur in a different sequence than that marked in the accompanying drawings. For example, two consecutive blocks may actually be performed basically in parallel, and sometimes the two consecutive blocks may be performed in a reverse sequence, depending on a function involved.

It should also be noted that each block in the block diagrams and/or flowcharts, and combinations of blocks in the block diagrams and/or flowcharts, may be implemented by hardware (for example, a circuit or an ASIC (Application Specific Integrated Circuit, Application Specific Integrated Circuit)) performing a corresponding function or action, or may be implemented by a combination of hardware and software, such as firmware.

Although the present invention is described herein with reference to embodiments, in a process of implementing the present invention that claims protection, a person skilled in the art may understand and implement other variations of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Sonic measures are recorded in dependent claims that are different from each other, but this does not mean that these measures cannot be combined to produce a good effect.

Embodiments of this application are described above, and the foregoing descriptions are exemplary, but not exhaustive, and are not limited to the disclosed embodiments. Without departing from the scope and spirit of the described embodiments, many modifications and variations are apparent to a person of ordinary skill in the technical field. Terms used herein are selected to best explain the principles, practical applications, or improvements to technology in the market, or to enable others of ordinary skill in the art to understand embodiments disclosed herein,

What is claimed is:

1. A method, comprising:
   receiving image data, wherein the image data is from a photographing process;
   obtaining an operation command and status information, wherein the operation command corresponds to the photographing process, wherein the status information indicates an execution status of the operation command, and wherein obtaining the operation command and the status information comprises:
      obtaining a target operation command from a plurality of operation commands, wherein the plurality of operation commands comprises a same operation type, and wherein the target operation command corresponds to a largest frame number in the plurality of operation commands; and
      executing the target operation command to obtain the status information;
   displaying, based on the image data, a picture; and
   displaying, based on the operation command and the status information, the execution status on the picture.

2. The method of claim 1, wherein obtaining the operation command and the status information comprises:
   generating, in response to an operation, the operation command;
   sending the operation command; and
   receiving, in response to sending the operation command, the status information.

3. The method of claim 1, wherein obtaining the operation command comprises receiving the operation command.

4. The method of claim 1, wherein an operation type of the operation command comprises focusing, zooming, turning on or off a flash, adjusting exposure, using a filter, beautifying, or skin smoothing.

5. The method of claim 1, wherein an operation type of the operation command comprises focusing.

6. The method of claim 1, wherein an operation type of the operation command comprises zooming.

7. The method of claim 1, wherein an operation type of the operation command comprises turning on a flash.

8. The method of claim 1, wherein an operation type of the operation command comprises turning off a flash.

9. The method of claim 1, wherein an operation type of the operation command comprises adjusting exposure.

10. The method of claim 1, wherein an operation type of the operation command comprises using a filter.

11. The method of claim 1, wherein an operation type of the operation command comprises beautifying.

12. The method of claim 1, wherein an operation type of the operation command comprises skin smoothing.

13. A method, comprising:
    capturing image data in a photographing process;
    sending the image data; and
    obtaining an operation command and status information, wherein the operation command is for the photographing process, wherein the status information indicates an execution status of the operation command, and wherein obtaining the operation command and the status information comprises:
       obtaining a target operation command from a plurality of operation commands, wherein the plurality of operation commands comprises a same operation type, and wherein the target operation command corresponds to a largest frame number in the plurality of operation commands; and
       executing the target operation command to obtain the status information; and
    sending the status information.

14. The method of claim 13, wherein obtaining the operation command and the status information comprises receiving the operation command.

15. The method of claim 13, wherein obtaining the operation command and the status information comprises generating, in response to an operation, the operation command.

16. The method of claim 13, wherein an operation type of the operation command comprises focusing, zooming, turning on or off a flash, adjusting exposure, using a filter, beautifying, or skin smoothing.

17. An apparatus, comprising:
    a memory configured to store instructions; and
    one or more processors coupled to the memory and configured to execute the instructions to:
       receive, from a terminal device, image data, wherein the image data is from a photographing process of the terminal device;
       obtain an operation command and status information, wherein the operation command corresponds to the photographing process, wherein the status information indicates an execution status of the operation command, and wherein obtaining the operation command and the status information comprises:
          obtaining a target operation command from a plurality of operation commands, wherein the plurality of operation commands comprises a same operation type, and wherein the target operation command corresponds to a largest frame number in the plurality of operation commands; and
          executing the target operation command to obtain the status information;
       display, based on the image data, a picture; and
       display, based on the operation command and the status information, the execution status on the picture.

18. The apparatus of claim 17, wherein the one or more processors are further configured to execute the instructions to generate, in response to an operation of the apparatus, the operation command.

19. The apparatus of claim 17, wherein the one or more processors are further configured to execute the instructions to receive, from the terminal device, the operation command.

20. The apparatus of claim 17, wherein an operation type of the operation command comprises focusing, zooming, turning on or off a flash, adjusting exposure, using a filter, beautifying, or skin smoothing.

* * * * *